US006898693B1

United States Patent
Singh et al.

(10) Patent No.: US 6,898,693 B1
(45) Date of Patent: May 24, 2005

(54) HARDWARE LOOPS

(75) Inventors: Ravi P. Singh, Austin, TX (US); Charles P. Roth, Austin, TX (US); Gregory A. Overkamp, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 706 days.

(21) Appl. No.: 09/705,088

(22) Filed: Nov. 2, 2000

(51) Int. Cl.[7] .................................................. G06F 9/00
(52) U.S. Cl. ...................................... 712/205; 712/241
(58) Field of Search ................................. 712/241, 205

(56) References Cited

U.S. PATENT DOCUMENTS

| 3,466,613 A | 9/1969 | Schlaeppi | 712/241 |
| 3,593,306 A | 7/1971 | Toy | 712/241 |
| 5,113,370 A | 5/1992 | Tomita | 711/165 |
| 5,524,223 A | 6/1996 | Lazaravich et al. | 712/241 |
| 5,579,493 A | 11/1996 | Kiuchi et al. | 713/320 |
| 5,809,326 A | 9/1998 | Nogami | 712/233 |

Primary Examiner—Eric Coleman
(74) Attorney, Agent, or Firm—Fish & Richardson P.C.

(57) ABSTRACT

In one embodiment, a programmable processor is adapted to include loop hardware to increase processing speed without significantly increasing power consumption. During a first pass through a loop, a first subset of a sequence of instructions may be loaded into the loop hardware. Then, during subsequent passes through the loop the first subset may be issued from the loop hardware while a second subset is retrieved from a memory device. In this manner, the second subset may be issued with no additional penalty after the first subset has been issued.

75 Claims, 20 Drawing Sheets

HARDWARE LOOPS

BACKGROUND

This invention relates to hardware loops implemented in a programmable processor.

In designing a programmable processor, such as a digital signal processing (DSP) system, two competing design goals are processing speed and power consumption. Conventional processors include a variety of hardware designed to increase the speed at which software instructions are executed. The additional hardware, however, typically increases the power consumption of the processor.

One technique for increasing the speed of a programmable processor is a "hardware loop," which may be dedicated hardware designed to expedite the execution of software instructions within a loop construct. Hardware loops may reduce the number of clock cycles used to execute a software loop by caching the instructions in local registers, thereby reducing the need to fetch the same instruction from a memory device or instruction cache a plurality of times.

Hardware loops introduce several challenges. These challenges include avoiding penalties such as setup penalties or branch penalties. Setup penalties are the loss of performance (usually an increase in processing time) associated with setting up a hardware loop. Similarly, branch penalties are the loss of performance (again, usually an increase in processing time) associated with a branch.

DESCRIPTION

Figure 1:
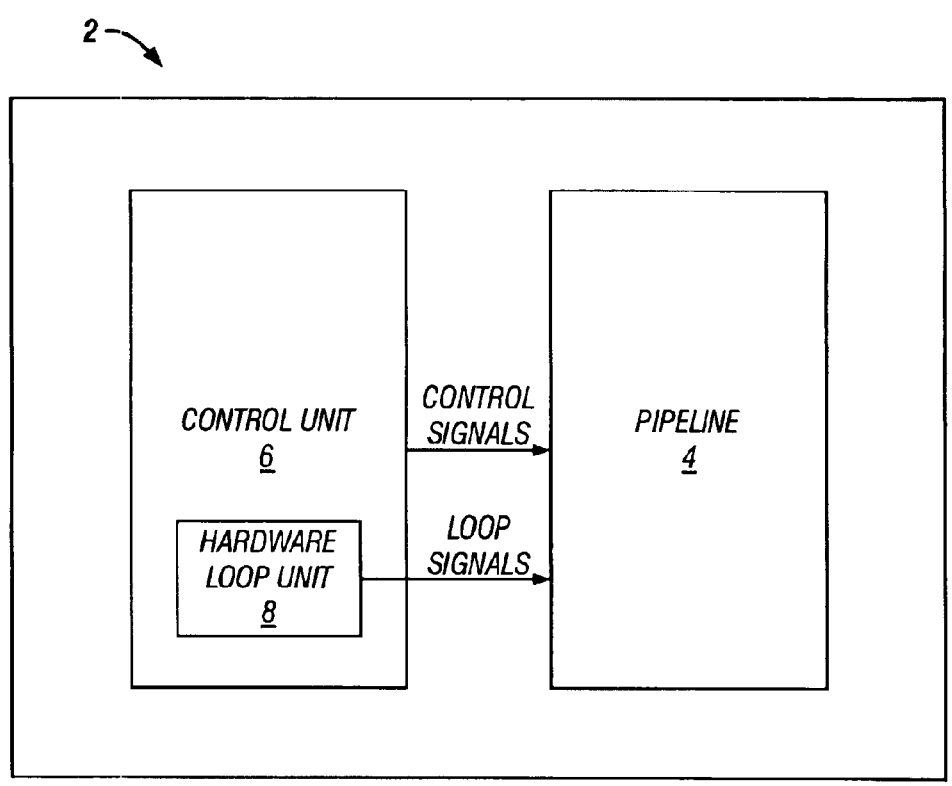
FIG. 1 is a block diagram illustrating an example of a pipelined programmable processor according to an embodiment of the invention.

FIG. 1 is a block diagram illustrating a programmable processor 2 arranged to support efficient hardware loops without significantly increasing power consumption.

In order to support hardware loops, a processor 2 may support a loop setup instruction that initializes the hardware by setting entry and exit conditions for the loop. Entry and exit conditions may be defined by loop conditions: top, bottom and count. The top condition defines the first instruction (or top) of a loop. The bottom condition defines the last instruction (or bottom) of a loop. And the count condition defines the number of iterations of the loop.

Entry of a hardware loop may occur at the first "top match." A top match may occur when the program counter (PC) is pointing to the top instruction of a loop. Exit of a hardware loop may occur at the last "bottom match." A bottom match may occur when the PC is pointing to the bottom instruction of a loop.

By initializing the count at the first top match and decrementing the count at each bottom match, the hardware may keep track of when it has encountered the last bottom match. In this manner, the loop conditions top, bottom and count may define the entry and exit conditions of a hardware loop.

Processor 2 may include an execution pipeline 4 and a control unit 6. Control unit 6 may control the flow of instructions and/or data through pipeline 4 during a clock cycle. For example, during the processing of an instruction, control unit 6 may direct the various components of the pipeline to decode the instruction and correctly perform the corresponding operation including, for example, writing the results back to memory.

Instructions may be loaded into a first stage of pipeline 4 and processed through subsequent stages. A stage may process concurrently with the other stages. Data may pass between the stages in pipeline 4 during a cycle of the system. The results of an instruction may emerge at the end of the pipeline 4 in rapid succession.

Control unit 6 may include hardware loop unit 8 that, as described below, may facilitate fast hardware loops without significantly increasing power consumption of processor 2.

Figure 2:
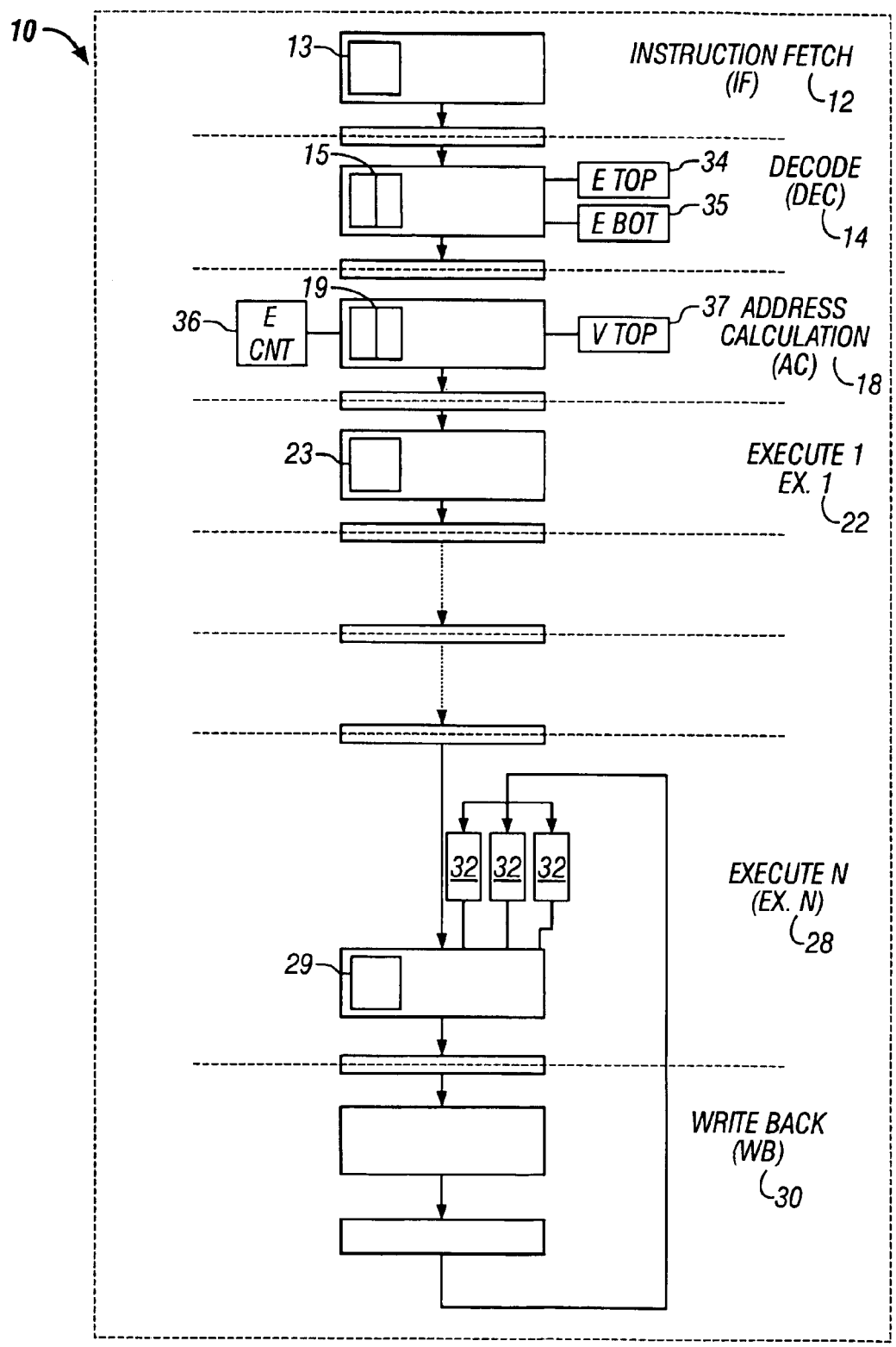
FIG. 2 is a block diagram illustrating an example execution pipeline for the programmable processor in accordance with an embodiment of the present invention.

FIG. 2 is a block diagram illustrating an example pipeline. A pipeline 10 has multiple stages that may facilitate execution of multiple instructions during a single clock cycle. In pipeline 10, an instruction may enter the instruction fetch (IF) stage 12 during a first, clock cycle. The instruction may then continue down the pipeline during subsequent clock cycles. Another instruction may enter the IF stage 12 after a previous instruction has exited. Thus, typically another instruction enters the IF stage 12 during a subsequent clock cycle and then continues down the pipeline during subsequent clock cycles. Similarly, additional instructions enter the IF stage 12 during subsequent clock cycles respectively. The number of stages in the pipeline may define the number of instructions that the pipeline may service simultaneously.

The different stages of the pipeline may operate as follows. Instructions may be fetched during the IF stage 12 by a fetch unit 13 and decoded from instruction registers 15 during the DEC stage 14. During the AC stage 18, data address generators 19 may calculate any memory addresses used to perform the operation.

During the execution stages (EX 1–EX n) 22 and 28, execution units 23 and 29 may perform specified operations such as, for example, adding or multiplying two numbers. Execution units may contain specialized hardware for performing the operations including, for example, one or more arithmetic logic units (ALU's), floating-point units (FPU) and barrel shifters, although the scope of the present invention is not limited in this respect. A variety of data may be applied to the execution units such as the addresses generated by data address generators, data retrieved from memory or data retrieved from data registers. During write back stage (WB) 30, the results may be written to a memory location or data registers external to the pipeline or to data registers in the pipeline such as architectural registers 32. The stages of pipeline 10 may include one or more storage circuits, such as a flip-flop, for storing data.

As mentioned above, processor 2 may support a loop setup instruction. The loop setup instruction may initialize the hardware loop by writing the boundaries of the hardware loop (e.g. top and bottom) to architectural registers 32 in the pipeline. The loop setup instruction may also initialize a count in architectural registers 32, indicating the number of times the loop is to be completed. In addition, the loop setup instruction may define an offset, indicating the number of instructions that follow the loop setup instruction before the top of the loop is reached. After the hardware loop is initialized, the hardware loop may operate in the pipeline 10 until the exit condition of the loop has been satisfied (e.g. a bottom match with count equal to zero).

Architectural registers 32 are generally loaded once an instruction has committed, e.g., at the conclusion of the WB stage 30. Therefore, the entry and exit conditions stored in architecture registers 32 may not be updated until several clock cycles have passed from when the loop setup instruction enters pipeline 10. Because the entry and exit conditions may not be updated until several clock cycles have passed, restrictions on setting up hardware loops may exist. For example, if the first instruction in the loop enters pipeline 10 before the loop setup instruction has committed, the architectural registers may not be set up to identify the instruction as part of a loop. Moreover, this problem may increase as the depth of the pipeline increases.

In one embodiment, processor 2 may overcome these restrictions by maintaining a set of early registers 34, 35 and 36 in the pipeline. As shown in FIG. 2, early registers ETop 34 and EBot 35 may reside in the decode stage while ECnt 36 may reside in AC stage.

Implementing a set of early registers 34, 35 and 36 may increase processing speed of processor 2 by reducing or avoiding loop set up penalties. As described above, several clock cycles may pass between the time a loop setup instruction enters the pipeline and the time the architectural registers are written. However, the early registers may be loaded long before the loop setup instruction writes to the architectural registers. For this reason, implementing early registers may reduce the time it takes to setup hardware loops.

The early registers may be speculative registers used to predict or speculate the value of architectural registers. Unlike the architectural registers, the speculative registers may not be supported by the system's instruction set. Therefore, program code may not be used to access the speculative registers. For this reason, a programmer may not be able to move data in or out of the speculative registers the same way that he or she could with architectural registers.

Loading early registers may be done in several different ways. For instance, the early registers may be loaded simply as a result of performing a regular instruction register move to the architectural registers. In other words, the system may instruct the architectural registers to load the contents of some other register, and as a result the early registers may be updated. Yet another way to load the registers is a "pop" from memory. In other words, the system may fetch the data from memory, load the architectural registers with that data, and update the early registers.

The problem with regular register moves or pops, however, is that they may introduce loop setup penalties. These penalties may occur because the system may stall the pipeline until the "moved" or "popped" data is available to be written. To avoid these penalties, a loop setup instruction may be used to load the early registers before the architectural registers get written.

The following example illustrates the syntax for invoking an exemplary loop setup machine instruction:

LSETUP (PC Relative Top, PC Relative Bottom) Counter=X

The PC Relative Top specifies the distance from the current instruction to the start of the loop (the Start Offset). The PC Relative Bottom specifies the distance from the current instruction to the end of the loop (the End Offset). In addition, the Counter variable may specify a counter register and a loop count indicating the number of iterations in the loop.

Figure 3:
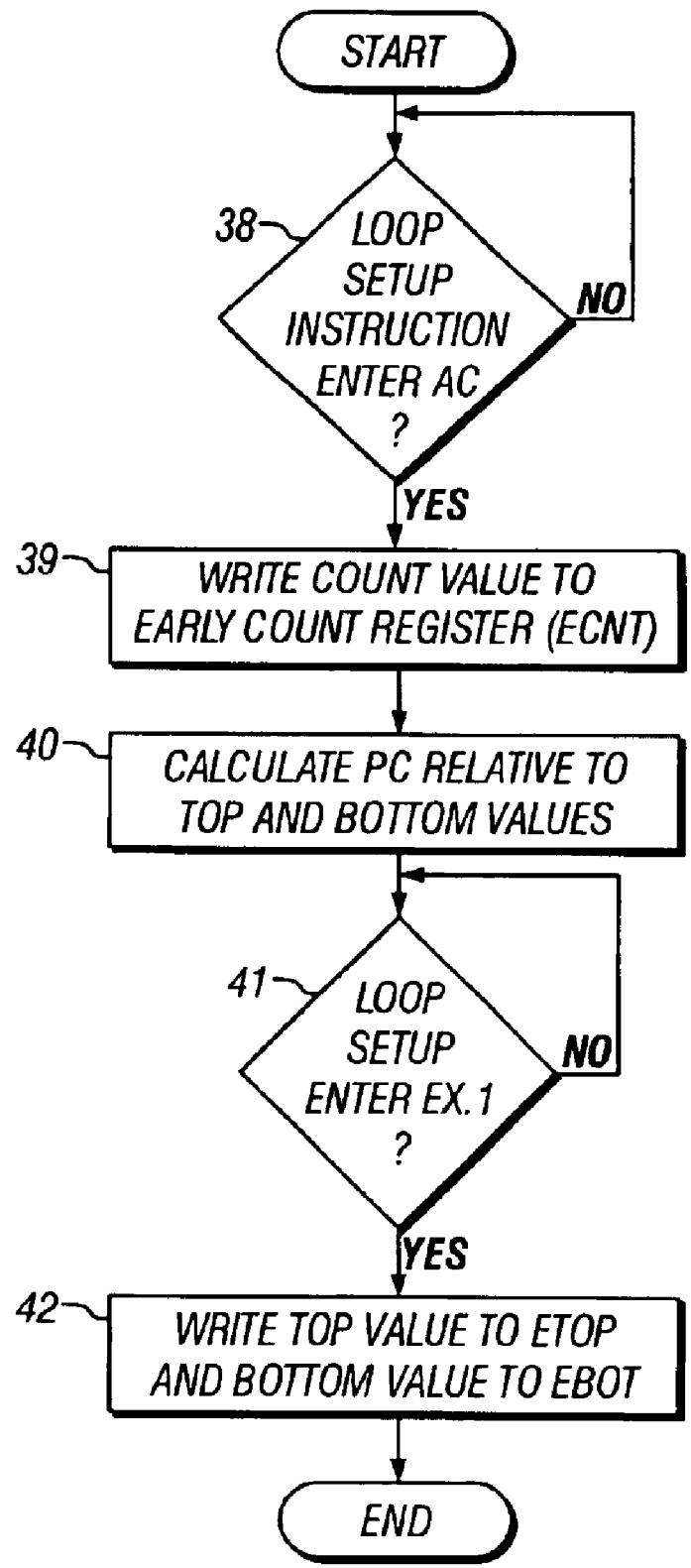
FIG. 3 is flow diagram illustrating exemplary timing of when early registers may be loaded in accordance with an embodiment of the present invention.

FIG. 3 is a flow diagram illustrating the timing when early registers get loaded in accordance with an embodiment of the present invention. As described, the loop setup instruction may contain loop conditions in the form of a count value, a top value, and a bottom value. Collectively, these three values may define entry and exit conditions of a hardware loop.

The count value may represent the number of iterations that the loop will make. Once the loop setup instruction enters AC (38), the count value may be written to the ECnt register (39). Initially writing to the ECnt register may be done via a register move from data registers contained in a different pipeline. In one mode of operation, the ECnt register may be written with data contained in PREG registers (see FIG. 6) in the DAG pipeline.

The top and bottom values may indicate which instruction is the top of the loop, and which instruction is the bottom of the loop. The top and bottom values in the loop setup instruction, however, may be program counter (PC) relative. Therefore, a calculation (40) in AC stage may be used to obtain the top and bottom values that will be written to ETop 34 and EBot 35 registers respectively. After the loop setup instruction enters EX 1 (41), the top and bottom values may be written to the ETop 34 and EBot 35 registers (42).

The ETop register 34 may be loaded to point to the first instruction of the loop (or top of the loop). The EBot register 35 may be loaded to point to the last instruction of the loop (or bottom of a loop). The ECnt register 36 may be loaded to specify the number of times that the circuit is to go through the loop. In one embodiment, ECnt 36 counts downward, decrementing as the circuit goes through the loop.

Figure 4:
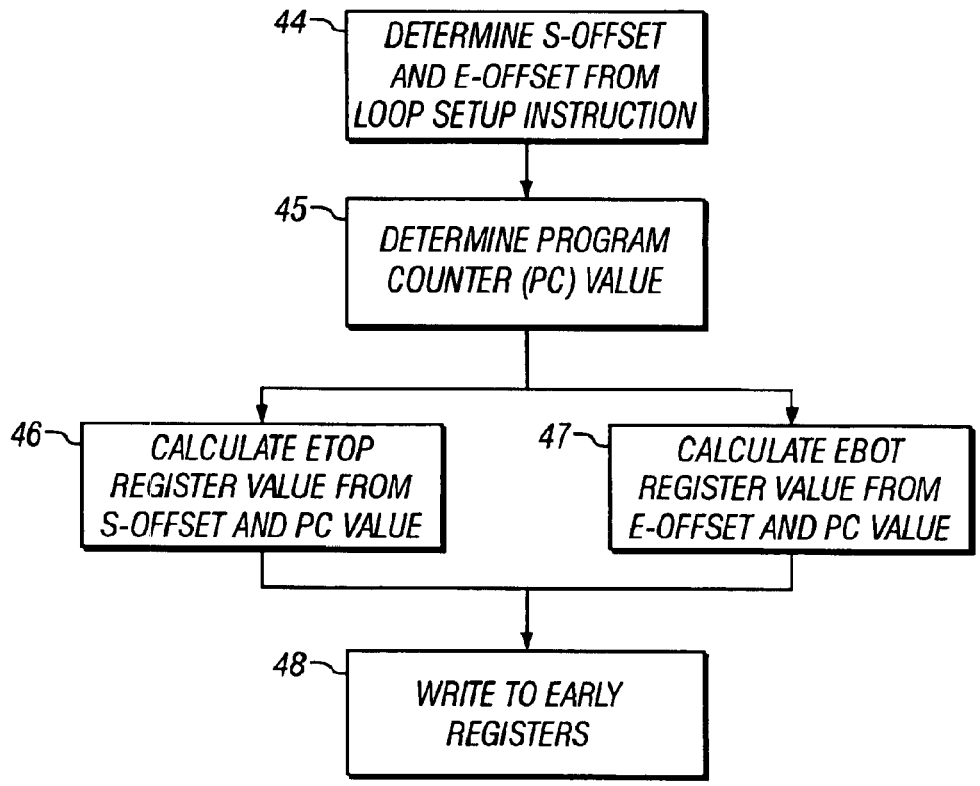
FIG. 4 is a flow diagram illustrating how a loop setup instruction may be used to determine early register values in accordance with an embodiment of the present invention.

FIG. 4 is a flow diagram illustrating one mode of operation of hardware loop unit 8 when a loop setup instruction is received and processed by pipeline 10. According to one format, the loop setup instruction may specify several setup variables including a Start Offset (S-Offset) and an End Offset (E-Offset). The S-Offset may specify the distance in the instruction stream from the loop setup instruction to the first instruction in the loop. Similarly, the E-Offset may specify the distance in the instruction stream from the loop setup instruction to the last instruction in the loop.

For instance, if the first instruction in the loop is the instruction immediately following the loop setup instruction, then the S-Offset would be the width of the loop setup instruction. If, in the instruction stream, there is one instruction between the loop setup instruction and the first instruction in the loop, then the S-Offset would be the width of the loop setup instruction and the one instruction. Similarly, if there are two instructions between loop setup and the first instruction, then the S-Offset would be width of the loop setup instruction and the two instructions.

As shown in FIG. 4, the S-Offset and E-Offset are typically specified by a loop setup instruction (44). However, the loop-setup instruction specifies the offsets relative to the program counter (PC). Therefore, the PC value must also be determined (45). The PC value and S-Offset may then be used to calculate ETop register data (46). Moreover, the PC value and E-Offset may be used to calculate EBot register data (47). Once calculated, the early register data may be written to the early registers (48).

Comparing FIG. 4 with FIG. 2 illustrates exemplary timing when writing the ETop and EBot registers. Steps (44) and (45) may occur in DEC stage 14. Calculations steps (46) and (47) may occur in AC stage 18. Therefore, the write step (48) may occur in EX 1 stage 22, although the scope of the invention is not limited in this respect.

Figure 5:
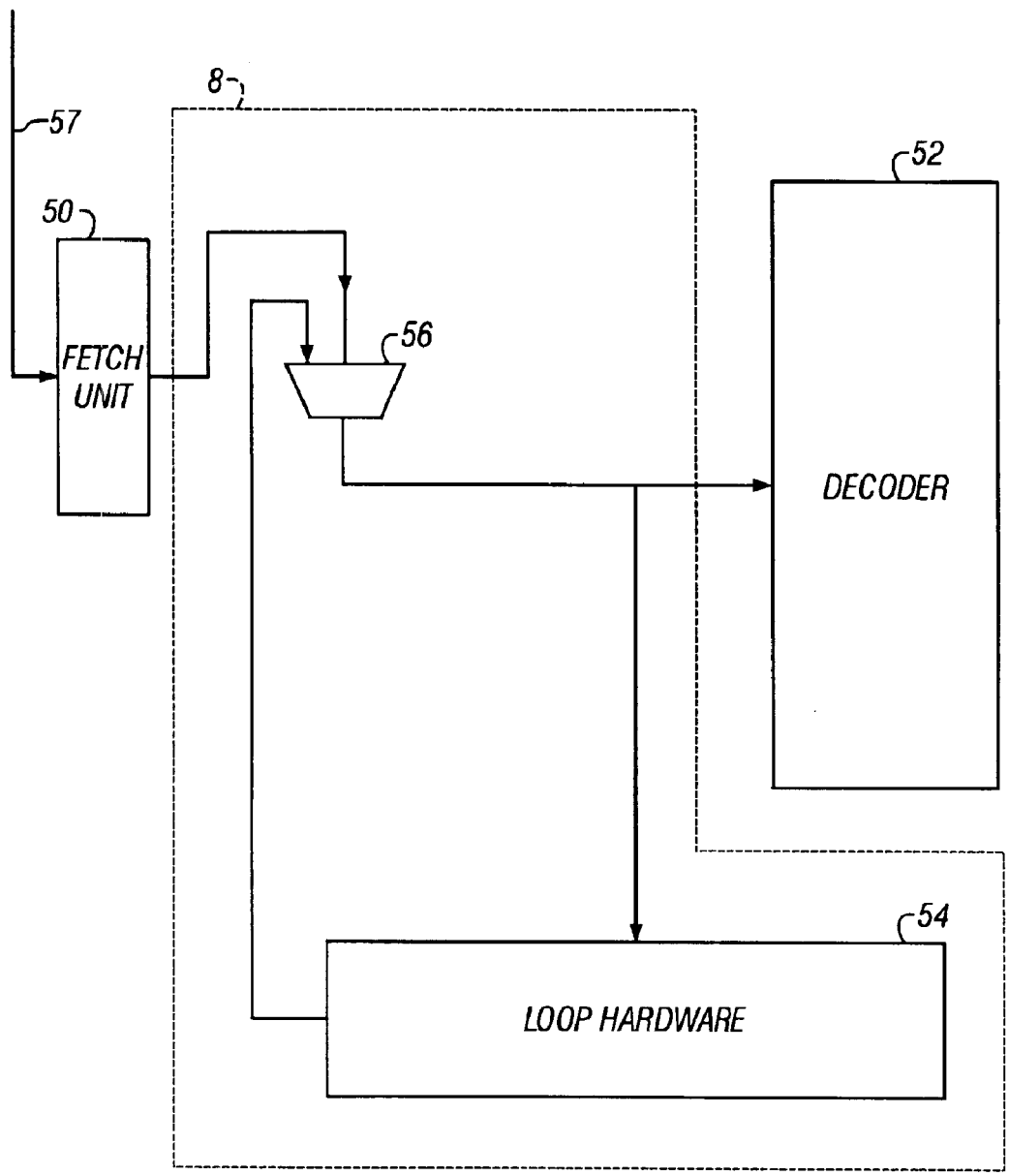
FIG. 5 is a circuit block diagram illustrating one embodiment of a hardware loop unit.

Once loaded, the early registers may be used to set up hardware loops. FIG. 5 is a block diagram illustrating one embodiment of a hardware loop unit 8 connected to an instruction fetch (IF) unit 50 and a decoder unit 52 of pipeline 10. In one embodiment, the early registers may be used to detect a loop in the stream of instructions 57. Loop hardware 54 is then loaded with one or more loop instructions. Once loaded, the loop instructions may be issued again and again from loop hardware. Thus, if the early registers detect an instruction loop, then one or more of the loop instructions may be fetched only once by IF unit 50, and then issued repeatedly from hardware loop unit 8.

Implementing early registers may introduce several challenges. For instance, one challenge introduced by the use of early registers arises because the early register data may need to be adjusted. If the pipeline must service an event, the pipeline's current operations may need to be terminated. If this termination occurs after an early register has been written, but before its respective architectural register has been written, then the early register data may need to be adjusted. In other words, because the early registers are written early, a termination in the pipeline before the loop has committed may require an adjustment of the early register data.

Figure 6:
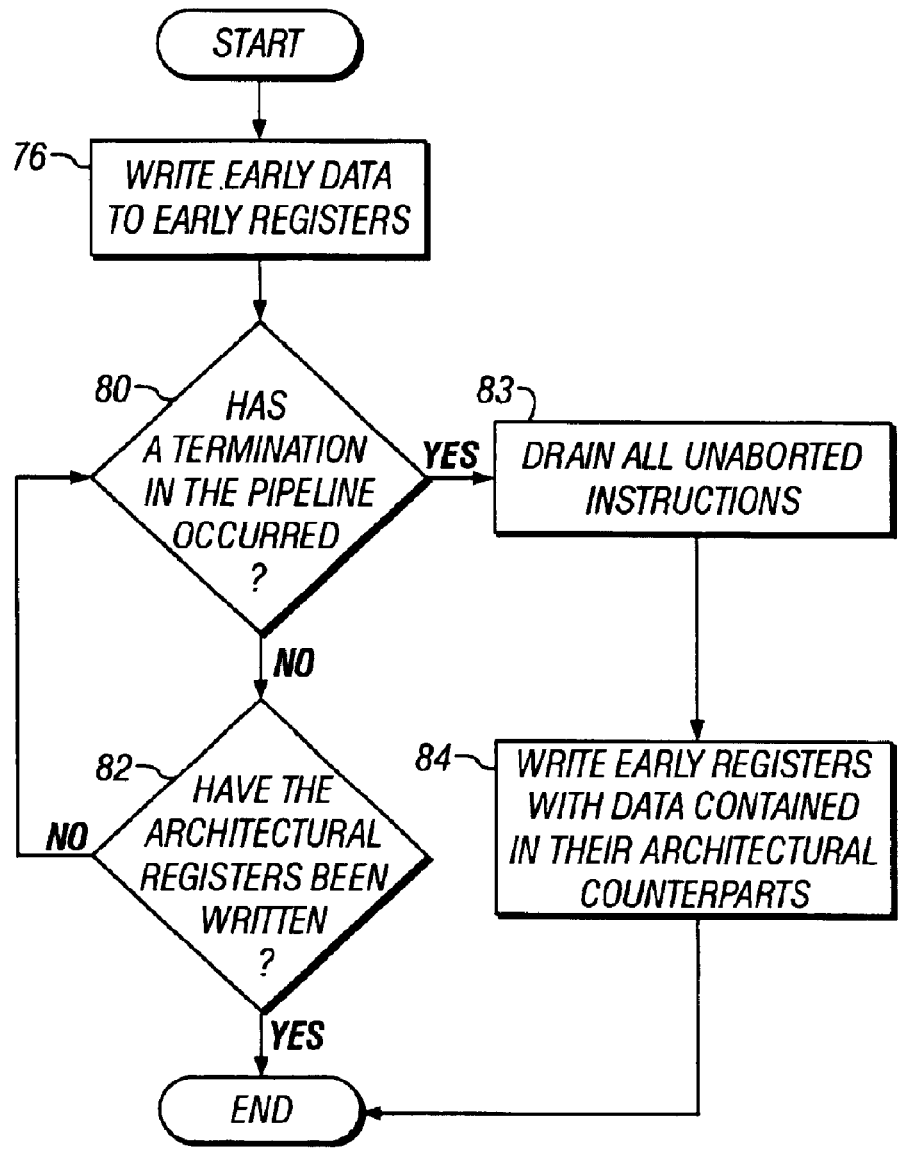
FIG. 6 is a flow diagram illustrating a mode of operation involving adjustment of early registers in accordance with the present invention.

FIG. 6 is a flow diagram illustrating a mode of operation involving adjustment of early registers. In particular, FIG. 6 illustrates the timing involved in adjusting ETop EBot, ECnt registers.

As shown in FIG. 6, the early registers may get written (76). In one embodiment of FIG. 6, the early registers are specifically the ETop, EBot, and ECnt registers (as shown in FIG. 2). If a terminate in the pipeline (80) occurs before the architectural registers have been written (82), then the unaborted instructions may be drained from the pipeline (83), and the early registers may be adjusted by writing the data contained in their respective architectural counterparts (84).

The mode of operation illustrated in FIG. 6 may be particularly useful when dealing with back-to-back hardware loops. If, for instance, a second loop is terminated before it commits, a first loop might still need to execute its remaining instructions in the pipeline. The adjustment technique in FIG. 6 provides a way to deal with this transition by adjusting early register values accordingly.

Figure 7:
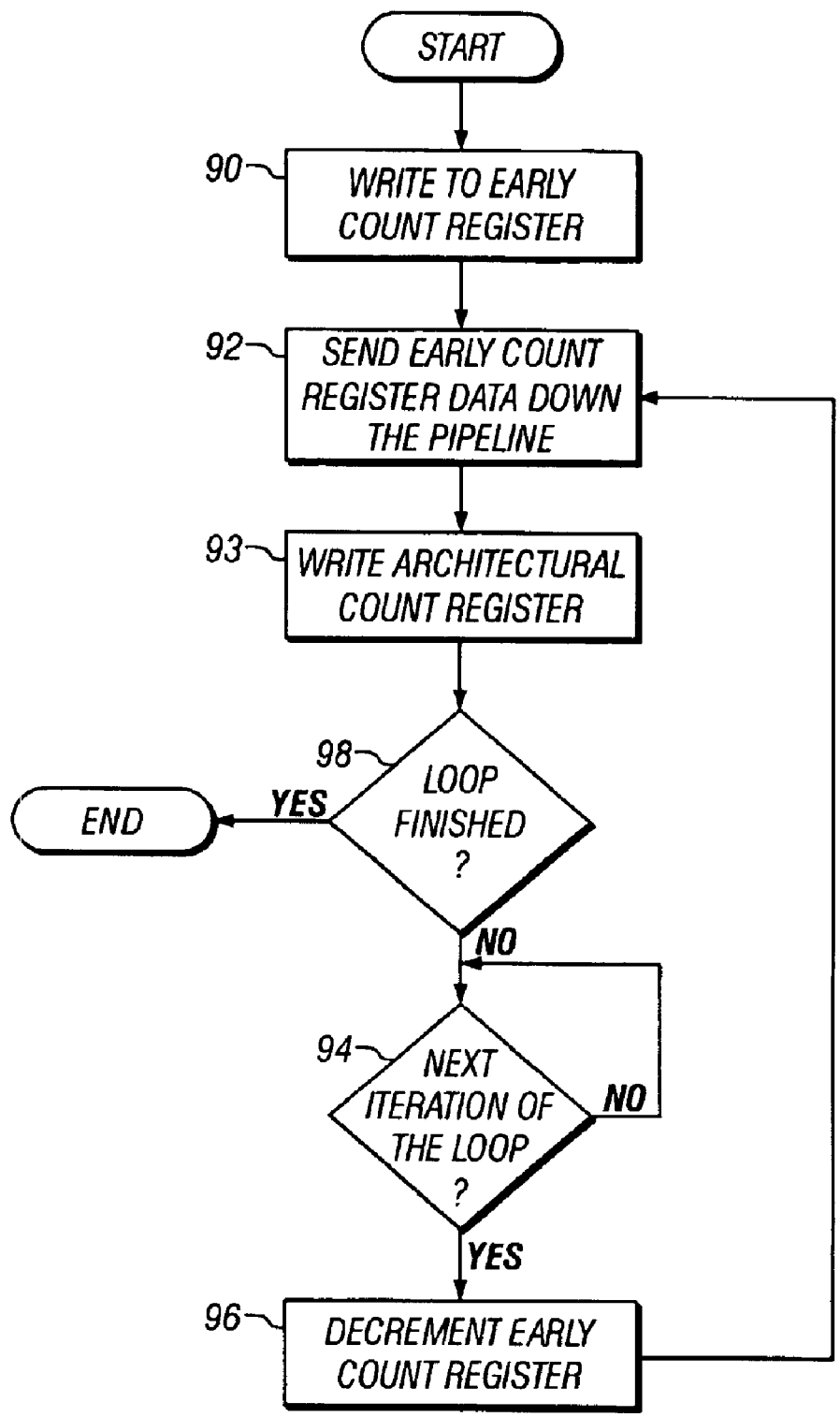
FIG. 7 is a flow diagram illustrating a way of updating architectural register values in accordance with an embodiment of the present invention.

FIG. 7 illustrates a way of updating the architectural register value with the Early Count (ECnt) data. Data may be written to an ECnt Register (90) in any manner described above. The ECnt register data may then sent down the pipeline (92) so that it gets written to the architectural count register (93) during WB stage. Then, in every subsequent iteration of the loop (94) the ECnt Register data may be decremented (96) and re-sent down the pipeline (92). This process may continue until the loop has finished its last iteration (98).

Figure 8:
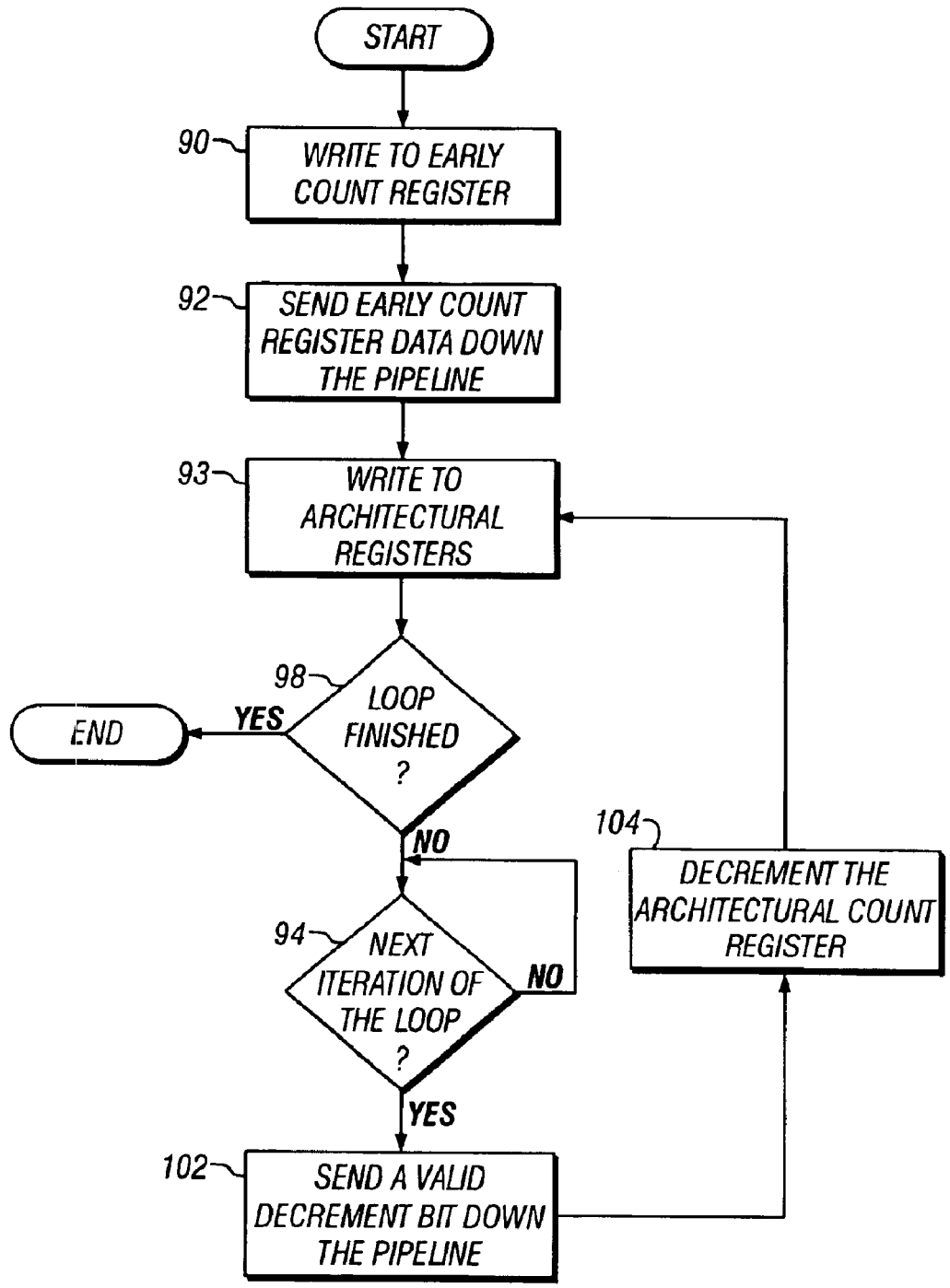
FIG. 8 is a flow diagram illustrating an alternative way of updating the architectural count register values in accordance with an embodiment of the present invention.

FIG. 8 illustrates an alternative way of updating the architectural count register. Rather than sending the ECnt data down the pipeline after every iteration of the loop, the mode of operation illustrated in FIG. 8 sends the ECnt data once. Then, in subsequent iterations of the loop, a single valid decrement bit may be sent to adjust the architectural count register.

In FIG. 8, data may be written to an ECnt Register (90) in any manner described above. The ECnt register data may then be sent down the pipeline (92) so that it gets written to the architectural count register (93) during WB stage. In subsequent iterations of the loop (94), a single valid decrement bit may be sent (102) to decrement the architectural count register (104). This process may continue until the loop has finished its last iteration (98).

Figure 9:
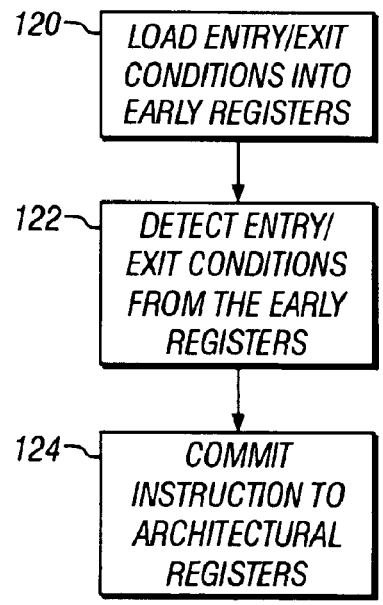
FIG. 9 is a flow diagram illustrating the timing advantages realized by the use of early registers in accordance with an embodiment of the present invention.

FIG. 9 is a flow diagram illustrating the timing advantages realized by the use of early registers. As shown in FIG. 9, loop entry/exit conditions may be loaded into a set of early registers (120). These early entry/exit conditions may then be detected (122) before a loop setup instruction has committed (124).

Adjusting the ECnt register may present additional challenges. Adjustment of the ECnt register may be done any time there is a termination of the pipeline prior to a loop being finished. This may be because valid instructions may still be in the pipeline and these valid instructions might adjust the architectural count register value once they commit.

One way of correcting the ECnt register data following a termination is to allow the instructions before the termination to commit and then write the ECnt register with its architectural counterpart. However, this may add an additional penalty if the branch penalty is less than the time it takes to drain the pipeline.

Figure 10:
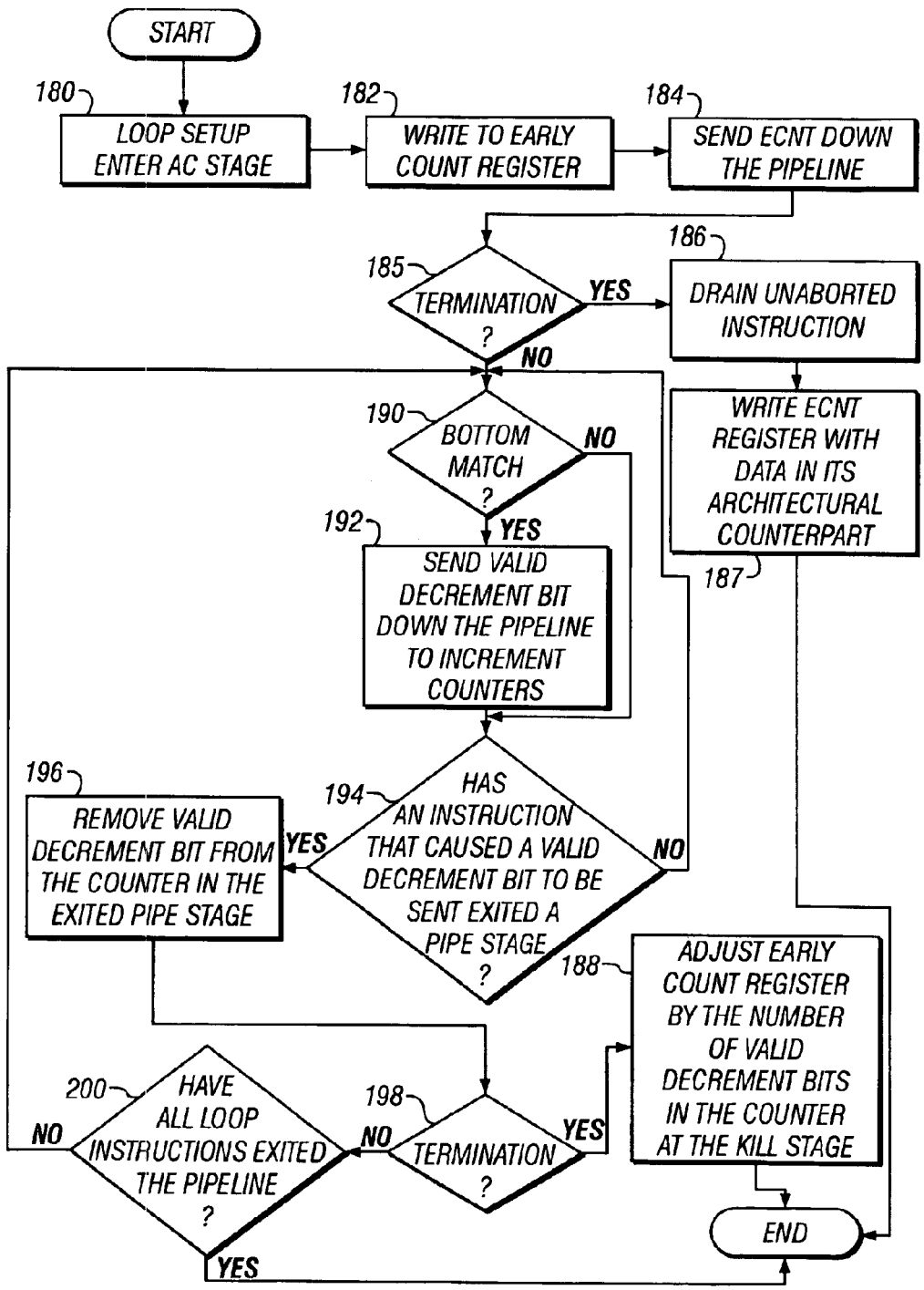
FIG. 10 is a flow diagram illustrating an efficient way of adjusting an early count value in accordance with an embodiment of the present invention.

FIG. 10 illustrates an efficient way of adjusting an early count value. As shown, after a loop setup instruction enters AC stage (180), the early count register may be written (182). At this point, the ECnt data may be sent down the pipeline (184). If a termination (185) occurs, unaborted instructions may be drained (186) and the ECnt register may be written with the data in its architectural counterpart (187).

At each bottom match (190) a valid decrement bit may be sent down the pipeline (192). When an instruction that caused a valid bit to be sent exits each pipe stage (194), a valid decrement bit may be removed from the counter at that exited pipe stage (196). In other words, the counters may be incremented when a valid bit is sent (e.g. at 192) and an individual counter may then decremented (e.g. at 196) when the instruction that caused the valid decrement bit to be sent exits the pipe stage.

If a termination occurs in the pipeline (198), the early count register may be adjusted (188) by the number of valid decrement bits in the counter at the termination stage. This adjustment value may also be represented in the respective counter of every pipe stage that resides later in the pipeline than the stage where the termination occurred. The steps in FIG. 10 may repeat themselves until all loop instructions have exited the pipeline (200).

The ECnt register may be decremented at every bottom match (e.g. for every pass through the loop). However, rather than propagate the whole ECnt value down the pipeline after every bottom match, only a single valid decrement bit may be sent down the pipeline. In this manner, a hardware reduction may be realized in the DSP system. The set of counters may monitor valid decrement bits and the associated instructions that caused those bits to be sent. As such, the set of counters may keep a running tab on differences between an early count register and its architectural counterpart.

Figure 11:
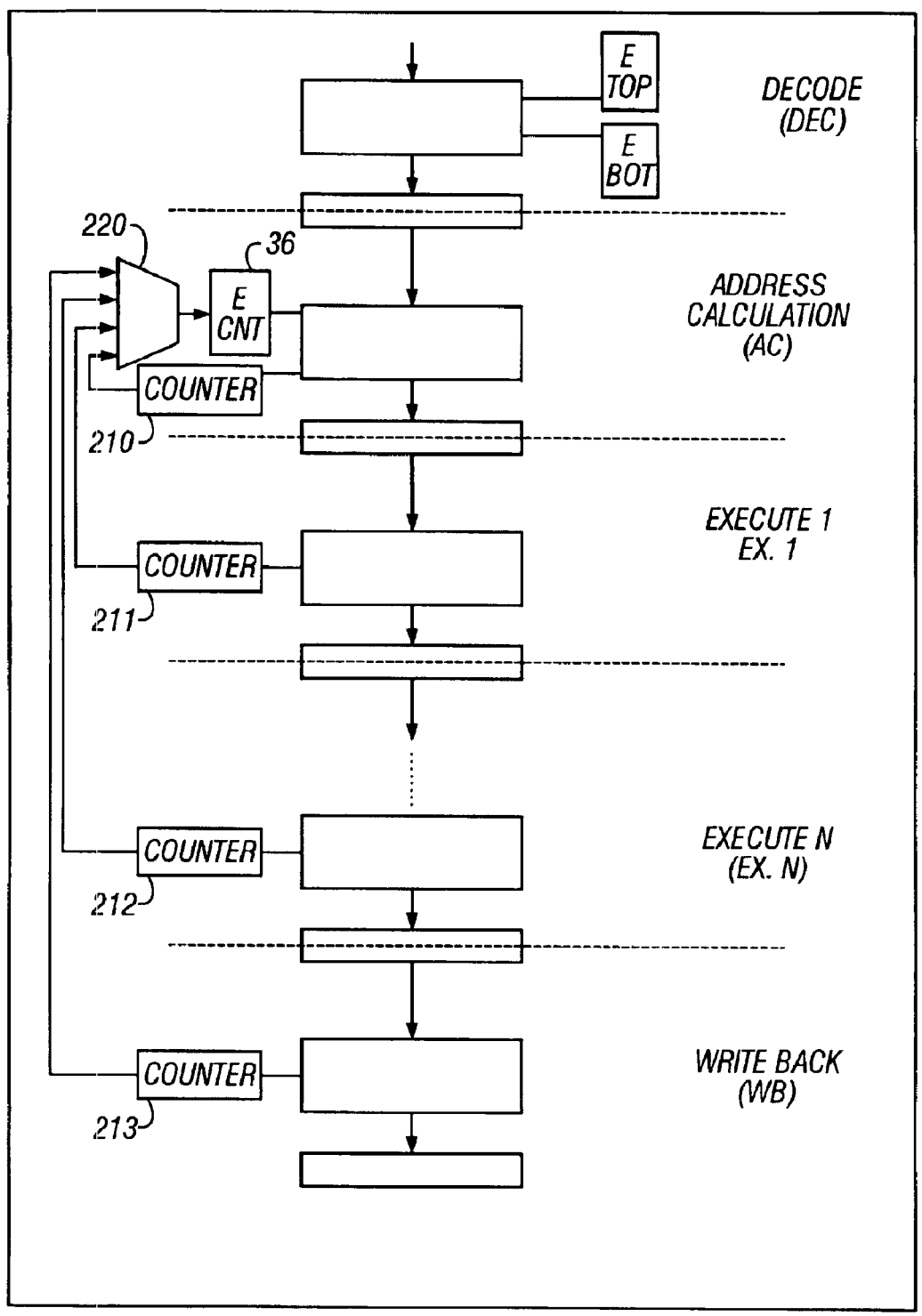
FIG. 11 is a block diagram illustrating counters in a circuit in accordance with an embodiment of the present invention.

FIG. 11 is a block diagram illustrating counters in a circuit. As shown, counters may be maintained at every stage of a pipeline after DEC (210, 211, 212 and 213). Therefore, a single valid decrement bit may be propagated down the pipeline to account for the difference between the early count register and its architectural counterpart. The counter may be connected to the input of a multiplexer 220. Multiplexer 220 may determine which counter, if any, is used to adjust the early count register 36.

In other embodiments, a termination may not occur at certain stages, or may be restricted when a certain instruction resides in a certain stage. In such embodiments, the circuit hardware may be reduced by not implementing counters in the stages where a termination is restricted.

The width of counters 210, 211, 212 and 213 may be altered as needed. For instance, counter 210 may be a one-bit counter and 211 may be a two-bit counter. The minimal depth of counters 212 and 213 may depend on the number of execution stages n in the pipeline. Counter 210 may be a one-bit counter because it always has a value of either 1 or zero. For instance, it has a value of one if a bottom match instruction is currently in AC. When the instruction leaves AC, the counter returns to zero.

Counter 211 and the next counter (e.g. for stage EX 2) may be two-bit counters, although the scope of the present invention is not limited in this respect. This is because counter 211 (e.g. the EX 1 counter) may have a maximum value of two, the EX 2 counter may have a maximum value of three. The EX 3 counter has a maximum value of four, hence, it may need three bits. Similarly, the next three counters (e.g. EX 4 to EX 6) may be three-bit counters capable of representing between five to seven values respectively.

The counter width for each stage may be determined by considering the maximum value that the counter may need to hold. This may correspond to the case where the loop is a single instruction loop. Thus, the depth of the counters may simply correspond to the number of stages between the counter and AC. Again, however, the size may also depend on whether a termination may occur in a particular stage; so some stages may not need counters.

Another mode of operation is a hybrid way of adjusting the early count register. The counters residing at the selected stages of the pipeline may be used to adjust the early count register if the penalty associated with draining the pipeline is greater than the branch penalty. However, if the drain penalty is less than or equal to the branch penalty, then the instructions in the pipeline may be allowed to commit so that the early count register may be adjusted from its architectural counterpart. System operation may be chosen depending on where in the pipeline the termination occurred. In one case, a pipeline having 3 execute stages may be drained if the termination occurs in EX 3 stage or WB stage; but the pipeline may not be drained and the early counter may be adjusted if the termination occurs before the EX 3 stage.

Figure 12:
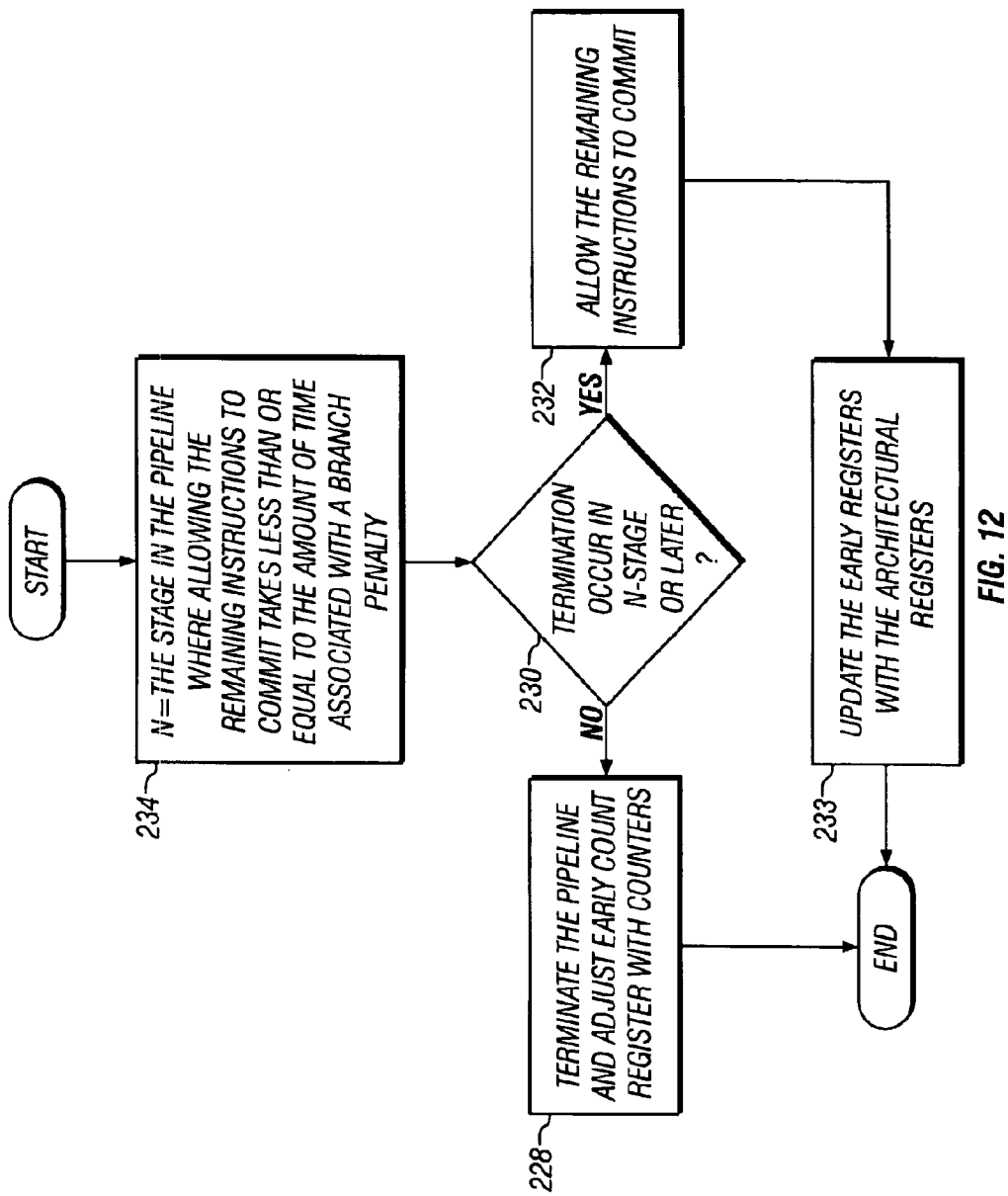
FIG. 12 is a flow diagram illustrating a hybrid mode of operation in accordance with an embodiment of the present invention.

FIG. 12 is a flow diagram illustrating a hybrid mode of operation. As shown, a counter may adjust an early count value (228) if a termination (230) occurs before the $n^{th}$ stage. However, if termination (230) occurs after the $n^{th}$ stage then the instructions in the pipeline may be allowed to flow through the pipeline and commit (232). The early registers may then be updated with the data in their architectural counterparts (233). The variable n may define the point at which allowing instructions to flow through the pipeline takes an amount of time less than or equal to the branch penalty (234).

Figure 13:
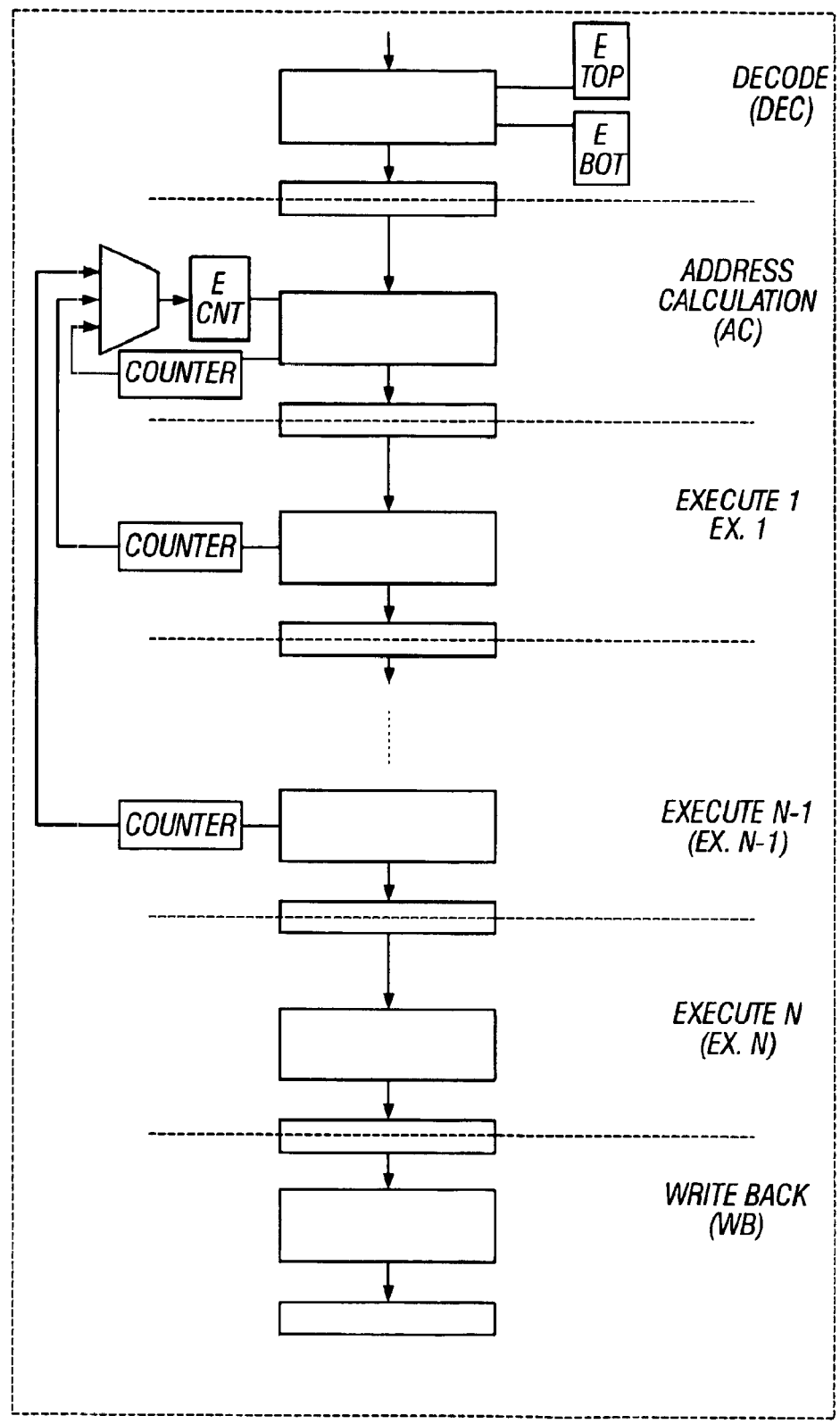
FIG. 13 is a block diagram illustrating a hybrid circuit having counters only in the first n−1 execution stages in accordance with an embodiment of the present invention.

FIG. 13 illustrates a hybrid circuit having counters in the first n–1 execution stages. The circuit may allow the pipeline to execute its instructions following a termination if an instruction has entered the n th execution stage. However, the circuit may adjust an early count register following a termination if an instruction has not entered the $n^{th}$ execution stage. Again, the variable n may define the point at which allowing instructions to flow through the pipeline takes an amount of time less than or equal to the branch penalty. In other cases, the variable n may reside much earlier in the pipeline (e.g. where the branch penalty is larger).

Additional loop hardware, such as loop registers and loop buffers, may facilitate fast hardware loops. Loop hardware as described herein, may provide several advantages. In some implementations, loop hardware may hide branch penalties. In addition, loop hardware may save power by removing the need to access memory devices such as cache or SRAM for every iteration of a loop. Furthermore, the loop hardware described below may have very few programming restrictions. Moreover, loop hardware may remove alignment restrictions that might otherwise exist in program memory.

Referring again to FIG. 1, illustrated is a programmable processor 2 having an execution pipeline 4 and a control unit 6. Control unit 6 may include hardware loop unit 8.

Hardware loop unit 8 may include one or more sets of loop buffers connected in series. In addition, the hardware loop unit may include one or more single instruction loop registers. A collection of loop buffers and/or loop registers may collectively be loop hardware. This collection may facilitate fast hardware loops. Referring again to FIG. 5, illustrated is a block diagram showing an embodiment of a hardware loop unit 8 connected to an instruction fetch unit 50 and a decoder unit 52 of pipeline 10. Instruction fetch unit 50 may provide one of a number of inputs to the hardware loop unit 8. Hardware loop unit 8 may comprise a multiplexer 56 connected to loop hardware 54. Loop hardware 54 may contain one or more sets of loop buffers and/or one or more loop registers. Moreover, the sets of loop buffers may include a defined number of buffers connected in series. Each set of loop buffers may have an associated loop register.

Figure 14:
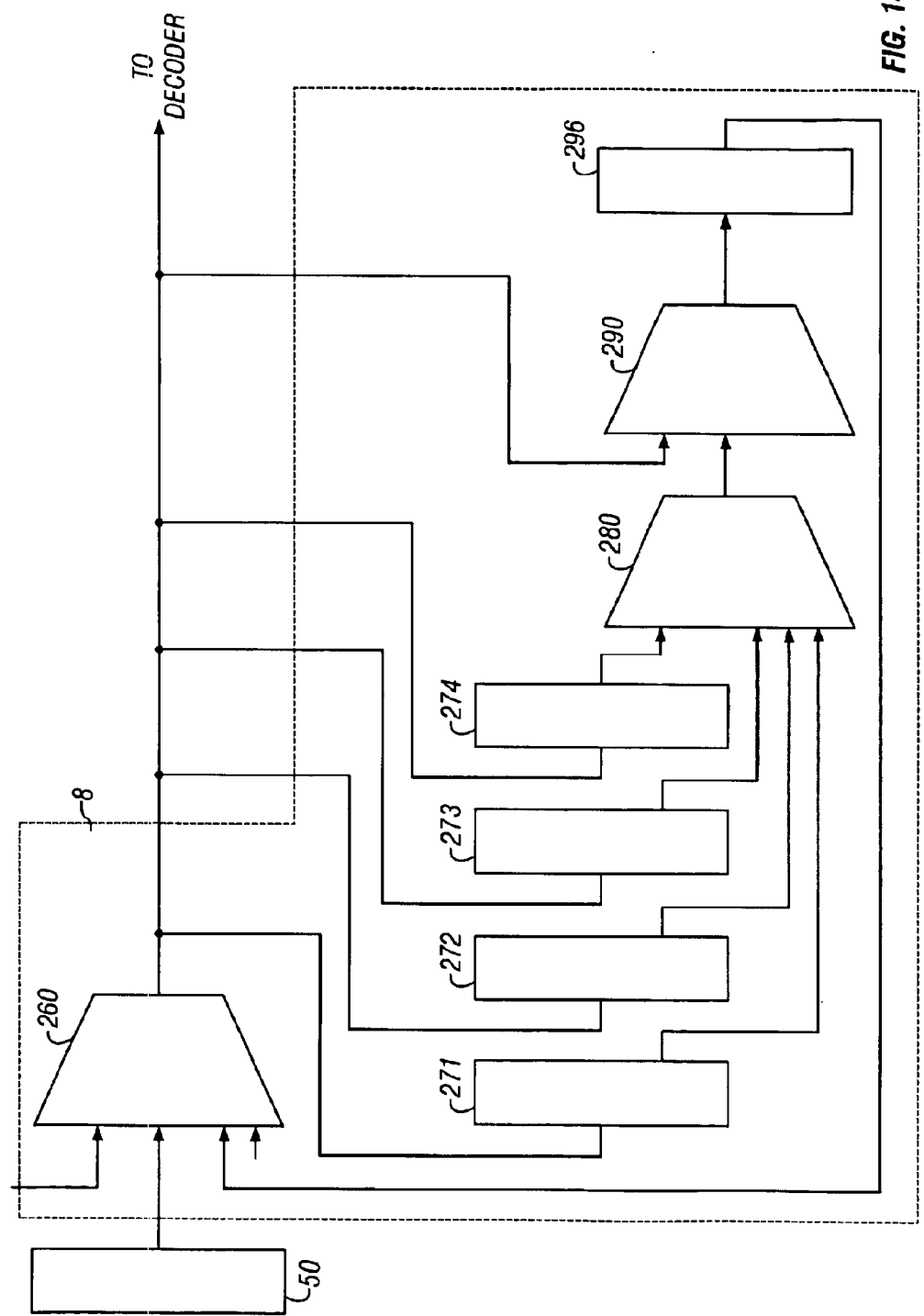
FIG. 14 a block diagram illustrating a hardware loop unit in accordance with an embodiment of the present invention.

FIG. 14 is another block diagram illustrating one embodiment of a hardware loop unit 8. Again, hardware loop unit 8 may be connected to an instruction fetch unit 50 and a decoder (not shown).

Hardware loop unit 8 may include a multiplexer 260 connected to loop hardware. Loop hardware may include a set of loop buffers 271, 272, 273 and 274 connected in series. These buffers may provide input to another multiplexer 280. Multiplexers 260 and 280, in turn, may provide inputs to multiplexer 290. Output of multiplexer 290 may be connected to a loop register 296, which may be connected back to the input of multiplexer 260. The output of hardware loop unit 8 may provide input to a decoder.

Multiplexer 260 may have a plurality of inputs. These may include an input from a register (e.g. an emulator instruction register) and an input from the fetch unit 50. In addition, multiplexer 260 may have an input from the loop instruction register and an input from one or more other hardware loop units.

Exemplary FIG. 14 illustrates loop hardware comprised of a 4-deep set of loop buffers and a single instruction register. However, any number of buffers and/or instruction registers could be used in other embodiments.

In exemplary modes of operation, loop buffers are implemented in two different scenarios. In one scenario, every instruction in the loop fits in the loop buffer. In another scenario, every instruction in the loop does not fit in the loop buffer. Each scenario is discussed in turn.

Figure 15:
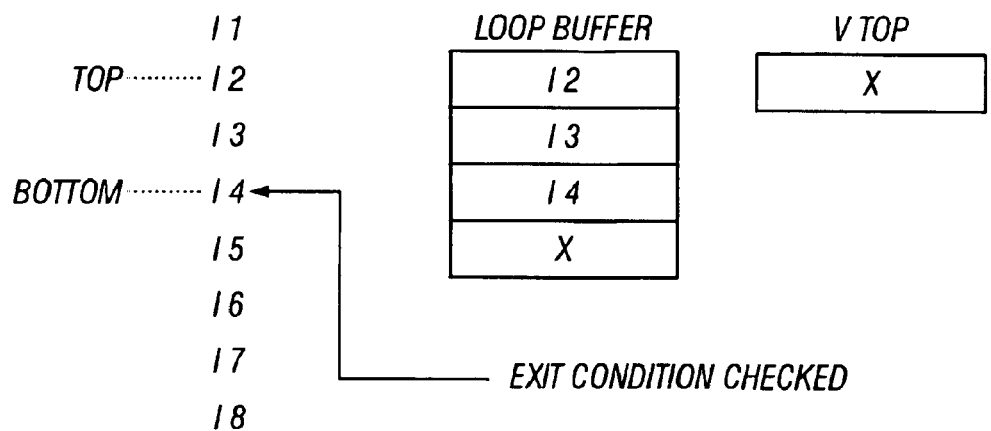
FIG. 15 is a diagram illustrating a scenario in accordance with an embodiment of the present invention.

FIG. 15 is a diagram illustrating one scenario. As shown, a 4-deep set of loop buffers may be loaded with a three-instruction loop (I2–I4). As such, one of the loop buffers and the VTop register may not be loaded with any data. Instructions I2–I4 may be executed again and again, until the exit condition of the loop is met. As shown, the exit condition may be checked every time the I4 instruction is issued from the loop buffer.

Figure 16:
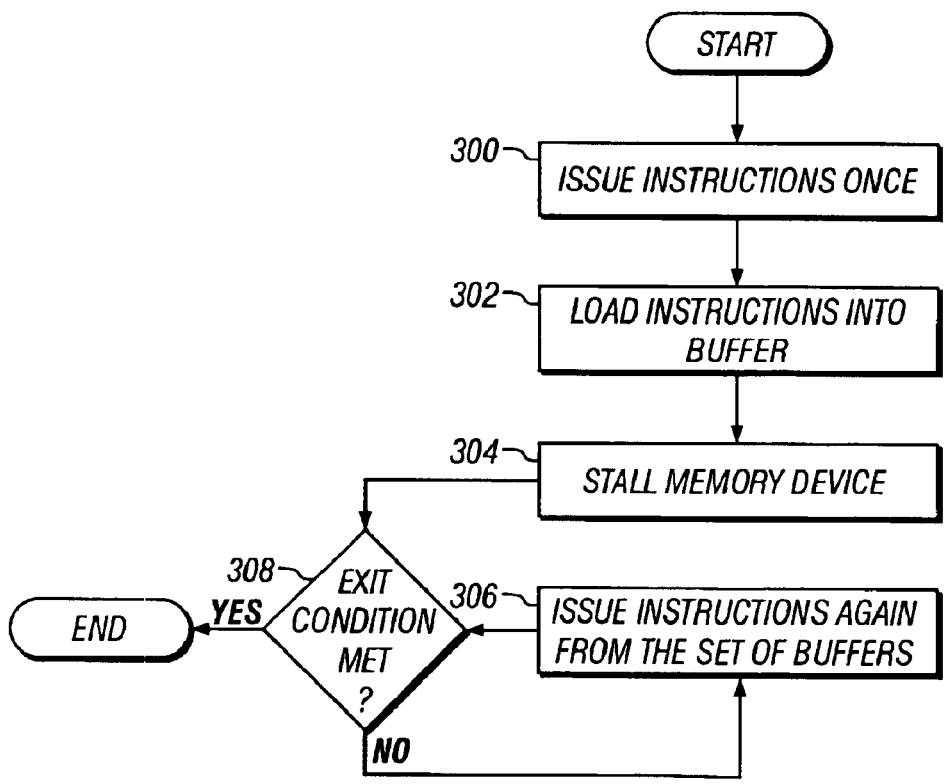
FIG. 16 is a flow diagram illustrating a scenario in accordance with an embodiment of the present invention.

FIG. 16 is a flow diagram illustrating one scenario. As shown, instructions may be issued (300), instructions may be loaded into a set of loop buffers (302), and the memory device may be stalled (304). Stalling the memory may provide power savings to the DSP system. After loading the instructions into the set of buffers (302), the instructions may be subsequently issued from the set of buffers (306). The instructions may be issued over and over again until the exit condition of the loop is met (308).

Figure 17:
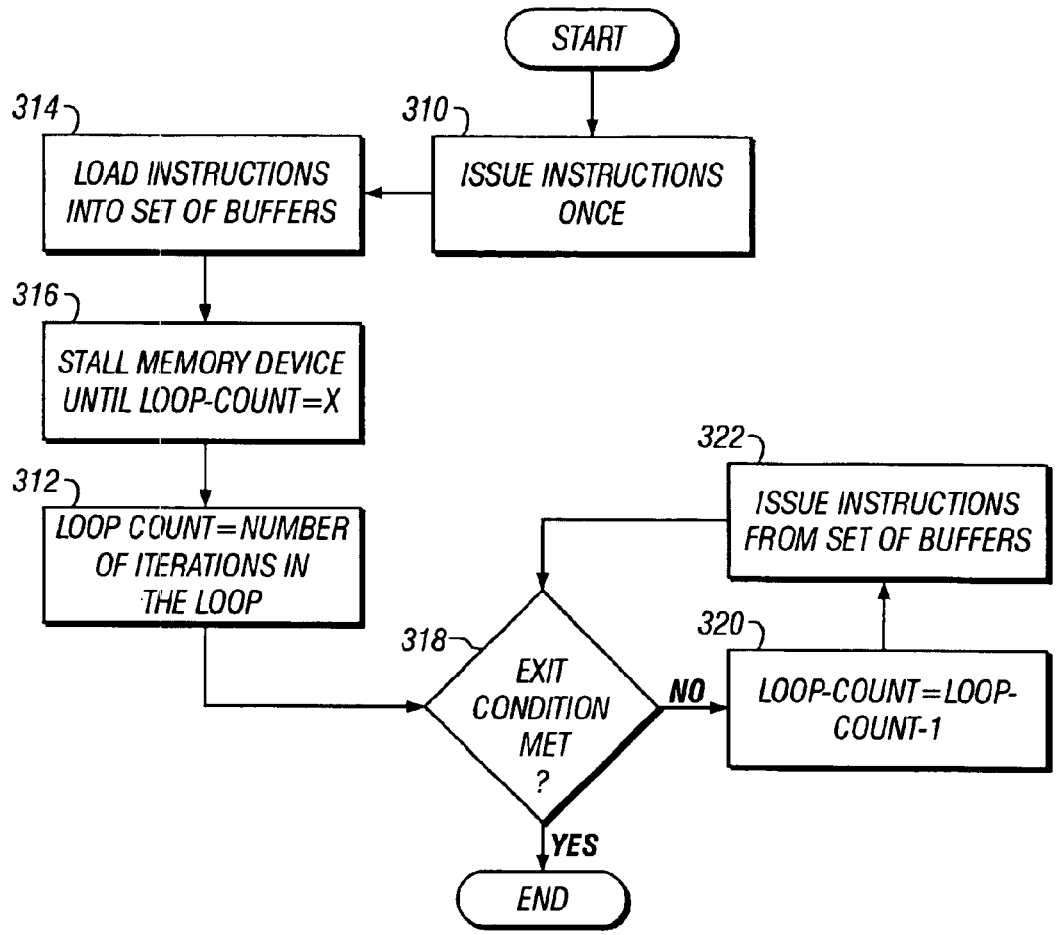
FIG. 17 is another flow diagram illustrating a scenario in accordance with an embodiment of the present invention.

FIG. 17 is another flow diagram illustrating one scenario. As shown, instructions may be issued (310), instructions may be loaded into a set of loop buffers (314), a memory device may be stalled (316), and a loop count may be initialized (312). As long as the exit condition of the loop is not met (318), the loop count may be decremented (320) and the instructions may be issued from a set of loop buffers (322). The memory device may be stalled until the loop count reaches a defined number X (316). Moreover, X may be defined such that the next instruction after the loop may be immediately ready in the fetch unit when the loop has finished. In this manner, a loop exit penalty may be avoided.

In other embodiments, a loop count is initialized (312) to zero. Adjustment (320) would then increment the loop count rather than decrement as shown in FIG. 17. Still other embodiments will become apparent in light of FIGS. 15–17.

Figure 18:
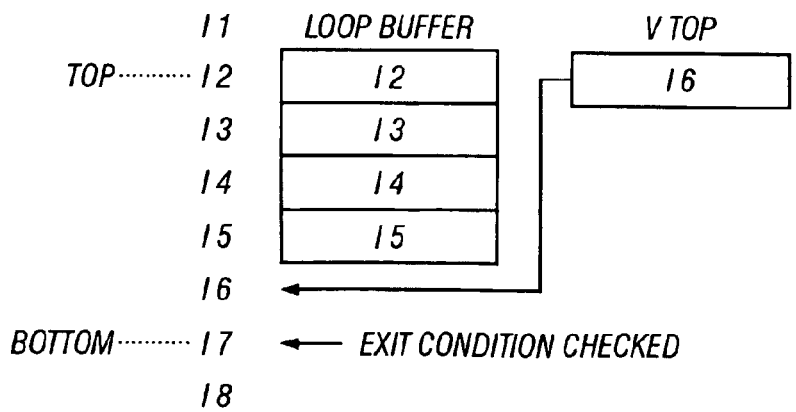
FIG. 18 is a diagram illustrating another scenario in accordance with an embodiment of the present invention.

FIG. 18 is a diagram illustrating another scenario. As shown, a 4-deep set of loop buffers may be loaded with four instructions of a loop (I2–I5). In addition, a VTop register may be loaded with the address of the next instruction in the loop. VTop may be an address register that resides in the pipeline (see FIG. 2, 37). During subsequent iterations of the loop, instructions I2–I5 may executed while I6 is being fetched. I6 may then be immediately ready for execution after I5 has been executed. The exit condition may be checked during iterations of the loop.

Figure 19:
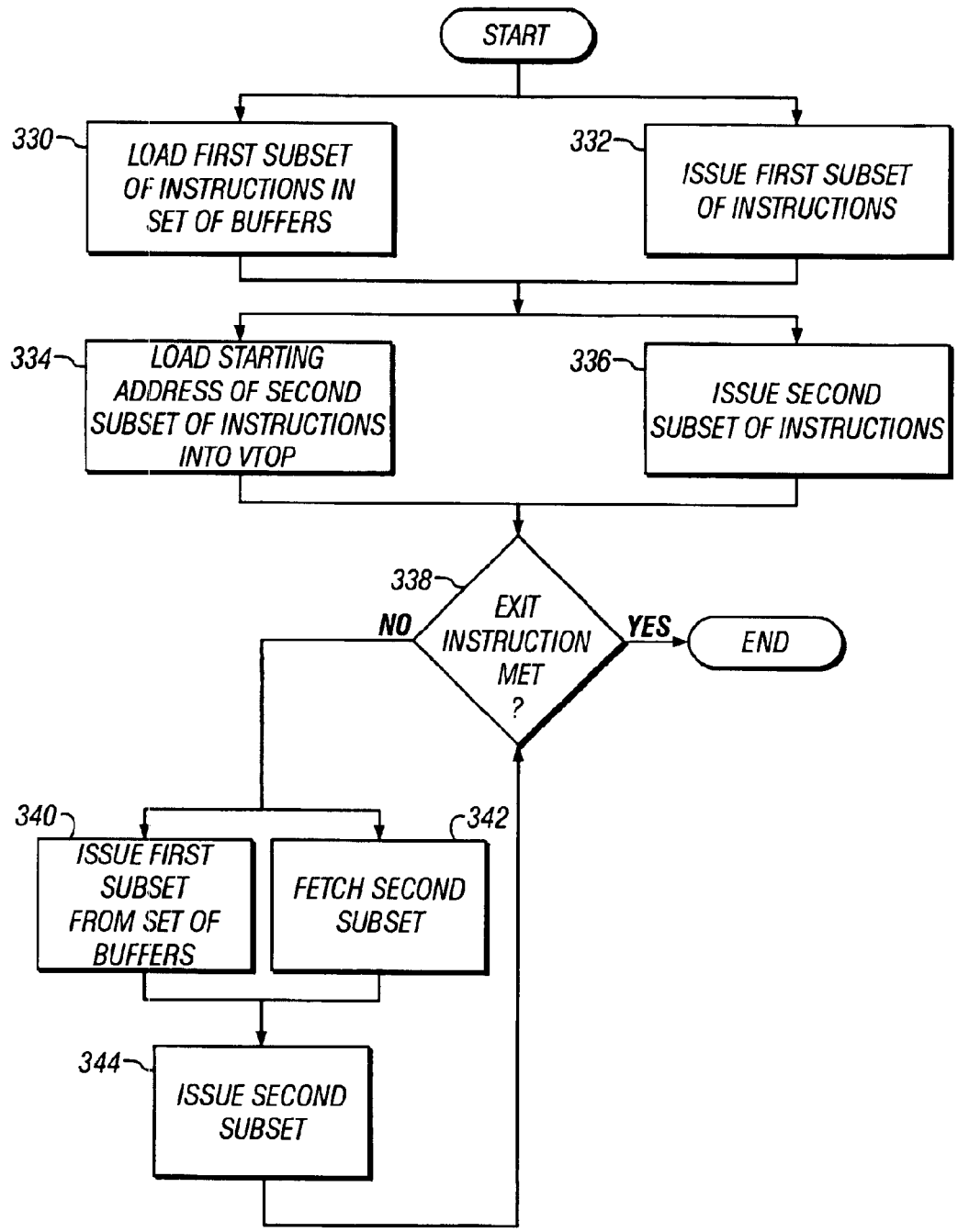
FIG. 19 is a flow diagram illustrating the other scenario.

FIG. 19 is a flow diagram illustrating the scenario of FIG. 18. As shown, a first subset of instructions may be loaded into a set of buffers (330), as the first subset of instructions is issued (332). Next, the starting address of the second subset of instructions may be loaded into a register (334) and the second subset may be issued (336). During subsequent iterations of the loop (the number of iterations being defined by the exit condition (338)), the first subset of instructions may be issued from the set of buffers (340) while the second subset is being fetched (342). The second subset may then be issued (344).

A mode of operation in accordance with FIG. 19 may realize several advantages. For instance, every time the first subset is issued from a set of buffers, power may be saved if the memory device is not firing. In addition, fetching a second subset while a first subset is issued may minimize loop penalties. In one embodiment, the loop buffer may have a depth that corresponds to at least the branch penalty. Thus, the penalty associated with fetching the second subset may be hidden behind the issuance of the first subset of instructions. This may increase the speed of the DSP system. In other embodiments, however, where power saving is a more important design feature (e.g. for circuits implemented in battery powered devices), deeper buffers may be more useful.

The first subset of instructions may be the number of instructions that fit in the set of loop buffers. The second subset of instructions may be the next instruction in the loop following those loaded in the buffers. Alternatively, the second subset may be a plurality of instructions that follow those loaded in the buffers.

Figure 20:
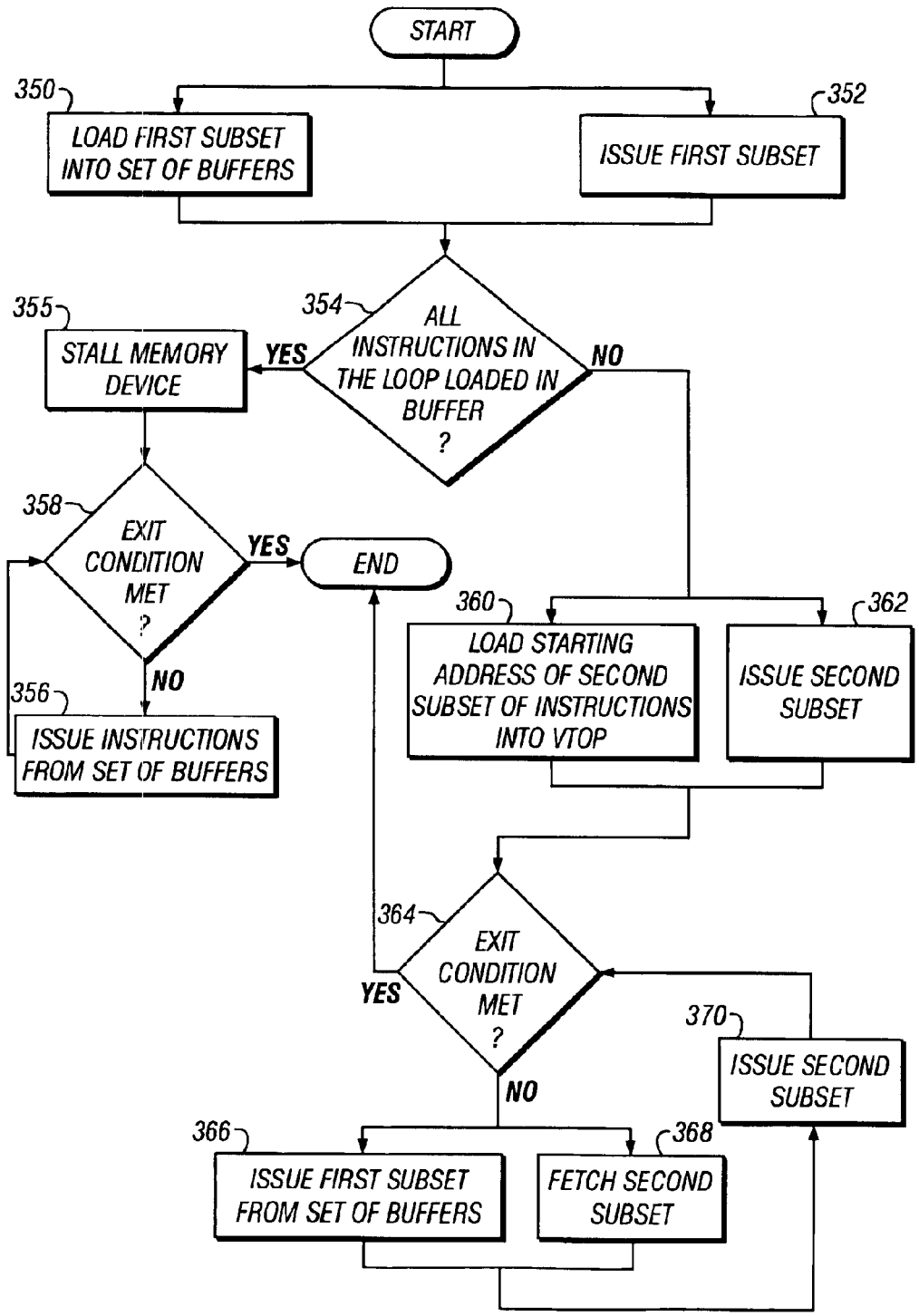
FIG. 20 is a flow diagram illustrating both scenarios in accordance with an embodiment of the present invention.

FIG. 20 is a more general flow diagram illustrating the scenarios described above. As shown, a first subset of instructions may be loaded into a set of buffers (350) and issued (352). If all instructions of the loop fit into the loop buffer (354), then a memory device may be stalled (355) and the instructions may be continuously issued from the set of buffers (356) until the exit condition is met (358).

If all the instructions of the loop do not fit into the loop buffer (354), then a second subset of instructions may be issued (360) and the starting address of those instructions may be loaded into a register (362). On subsequent iterations of the loop (as defined by the exit condition (364)), the first subset of instructions may be issued from the set of buffers (366) while the second subset is fetched from memory (368). The second subset may then be issued (370).

In the scenario of FIG. 18, a request for the address pointed by VTop may be made every time there is a bottom match. In this manner, a first subset of instructions may be dispatched while fetching a second subset of instructions.

By the time the first subset of instructions in the loop has been dispatched, the cache/memory may have already been accessed and an alignment buffer primed with the second subset of instructions. The alignment buffer may hold multiple instructions (depending on the width of each instruction). If the second subset includes a plurality of instructions, the plurality may be aligned in the alignment buffer with the first instruction of the second subset being an instruction associated with a VTop register.

Operation may further include requesting the next instruction following that associated with VTop while the instruction associated with VTop is dispatched. For example, in one mode of operation, the instruction associated with VTop is a 64-bit instruction. As that 64-bit instruction is dispatched, the next 64-bit instruction (as defined by alignment in memory) may be fetched. By repeating this over and over again, a DSP system may dispatch instructions in a fast and efficient manner.

Prior art programmable processor systems that implement hardware loops may require many restrictions in the operating code. However, it is highly desirable to provide for hardware loops that have very few programming restrictions. In one embodiment, a system in accordance with the present invention may have only one programming restriction. The single restriction may be that the system cannot have a branch on a loop bottom.

Fast hardware loops may have situations where a loop buffer calls for invalidation. These situations might include invalidation where a loop buffer has been populated with a conditional branch. Thus, in one mode of operation, a set of loop buffers may be invalidated if one of the first n instructions in a loop is a conditional branch. The variable n may define the depth of the set of loop buffers.

Another situation where a loop buffer may require invalidation is when an event is received while a loop buffer is being loaded. In addition, a loop buffer may require invalidation following a C_SYNC for self-modifying code. Thus, other modes of operation involve invalidating a loop buffer when either of these two situations arise.

Zero offset loops may introduce additional challenges. Offsets may refer to the distance between the loop setup instruction and the first or last instruction in the loop. In prior art systems, offsets are necessary to facilitate setup of hardware loops or to account for programming exceptions in the system. Facilitating zero offset loops, however, is highly advantageous because it may reduce processing time.

Even in a system that implements early registers and loop buffers, zero offset loops may raise challenges. For instance, in the system described above, by the time the early registers are written (e.g., in Ex 1) the first instruction of a zero offset loop may already be in AC. Thus, since the beginning of the loop exits DEC even before Etop and Ebot get written, the circuit may effectively "miss" a top match.

Special modes of operation and circuit arrangements have been designed to detect and deal with zero offset loops. In one mode of operation the start offset (S-offset) in a loop setup instruction is compared to a known value to detect zero offset. In this manner, early detection of a zero offset loop is facilitated. In a particular embodiment, the S-offset is compared to 4, where 4 refers to the four bytes of a 32 bit instruction. Once detected, a zero offset loop may be set up even before the early registers get written.

Figure 21:
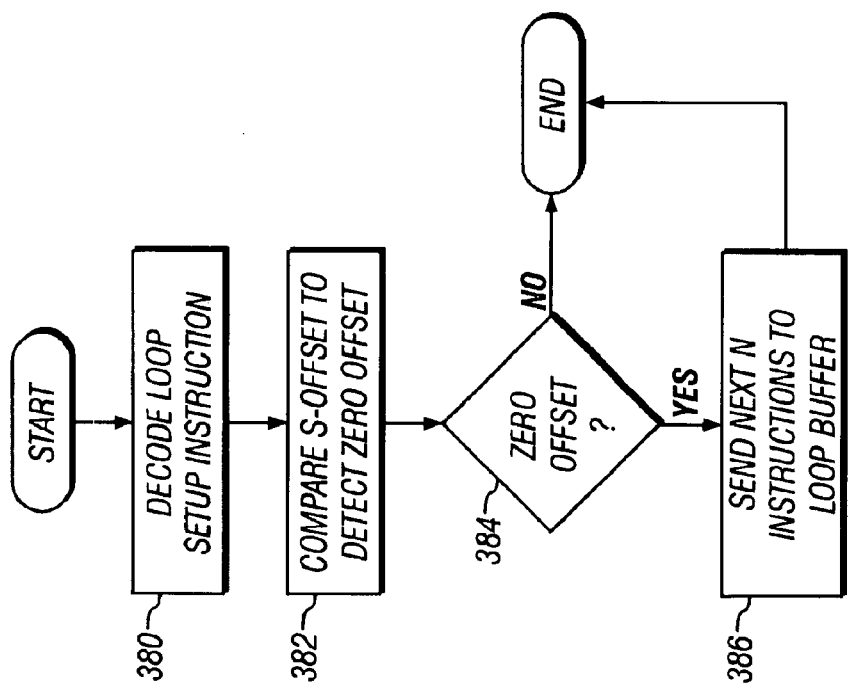
FIG. 21 is a flow diagram illustrating a mode of operation for detecting a zero offset loop in accordance with an embodiment of the present invention.

FIG. 21 is a flow diagram that illustrates a mode of operation for detecting a zero offset loop. As shown, a loop setup instruction may be decoded (380). The s-offset may then be compared to a defined number (382) (the defined number corresponding to the width of the loop setup instruction). In this manner, a zero offset loop may be detected even before the early registers get written. If zero offset loop is detected (384), the next n instructions in the loop may be issued and loaded into a loop buffer (386) as described above.

Figure 22:
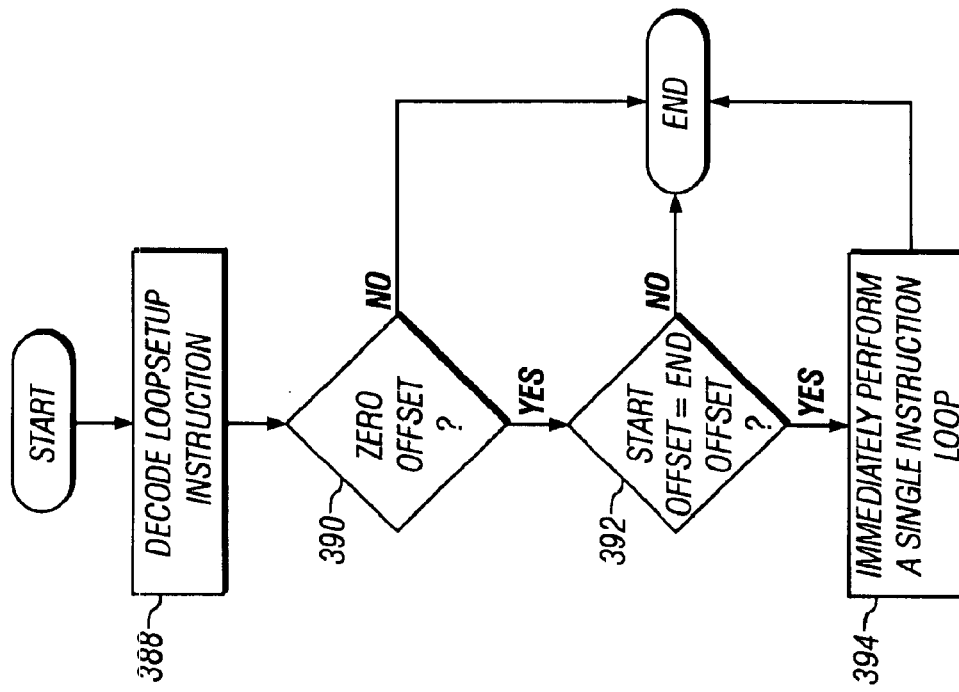
FIG. 22 is a flow diagram illustrating a mode of operation for detecting and dealing with a single instruction zero offset loop in accordance with an embodiment of the present invention.

FIG. 22 is a flow diagram that illustrates a mode of operation for detecting and dealing with the special case of a single instruction zero offset loop. As shown, a loop setup instruction may be decoded (388). If zero offset is detected (390), and the Start Offset equals the End Offset (392), then a single instruction loop may be immediately performed (394). Zero offset may be detected when the s-offset equals the width of the loop setup instruction. A single instruction loop may be detected when the s-offset and e-offset are the same.

Special hardware may facilitate setting up and executing a single instruction loop as quickly as possible. Referring again to FIG. 14, the loop register 296 may be used for this special case. Thus, step (394) may be performed by loading loop hardware (such as loop register 296) with the single instruction, and repeatedly issuing that instruction out of hardware loop unit 8 until the exit condition of the single instruction loop is met.

A single instruction loop may be detected and then performed by holding the instruction in decode in a special loop instruction register 296 (see FIG. 14). In addition, memory devices may not be accessed and everything upstream may be stalled to save power. Moreover, since the single instruction loop may be issued out of loop instruction register 296, the instruction fetch unit 50 may be free to fetch the next instruction (e.g. from a cache). Thus, when the single instruction loop has finished execution the next instruction may already be in the instruction fetch unit 50, resulting in zero penalty loop exit.

In summary, zero offset hardware loops may be broken into three cases. In the first case, a zero offset single instruction loop may be immediately issued out of decode via a loop instruction register. In the second case, a zero offset n-instruction loop may be immediately detected and loaded completely into an n-deep set of loop buffers. And in the third case, a zero offset loop may be immediately detected and the first n-instructions of that loop loaded into an n-deep set of loop buffers. The next instruction may then be associated with a VTop register.

In one embodiment, loop hardware as described herein, may be implemented in a pipeline. This may be much more advantageous than implementing buffers in a cache.

In one mode of operation, loop instructions may be stored in loop hardware such that the instructions are aligned to an instruction boundary. This may be more advantageous than aligning instructions to an address boundary. Once aligned to an instruction boundary in loop hardware, no alignment of instructions may be necessary when they are subsequently issued from the loop hardware.

To align instructions to an instruction boundary, a set of instructions may be loaded in an order of execution into the loop hardware and the address of the next instruction may be stored in an address register. In addition, a second set of instructions may be loaded in order of execution into a memory device. Loading instructions in an order of execution into loop hardware may comprise loading n sequential instructions into n buffers, where n is a positive integer. Moreover, the n sequential instructions may be any sequential instructions including the first n instructions of a loop or the last n instructions of a loop.

Figure 23A:
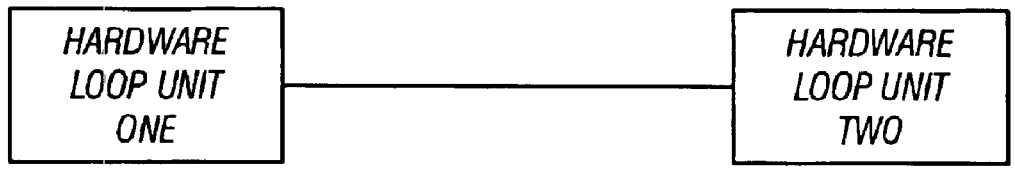
FIGS. 23A–23C are block diagrams illustrating a number of hardware loop units connected to one another in accordance with an embodiment of the present invention.
Figure 23B:
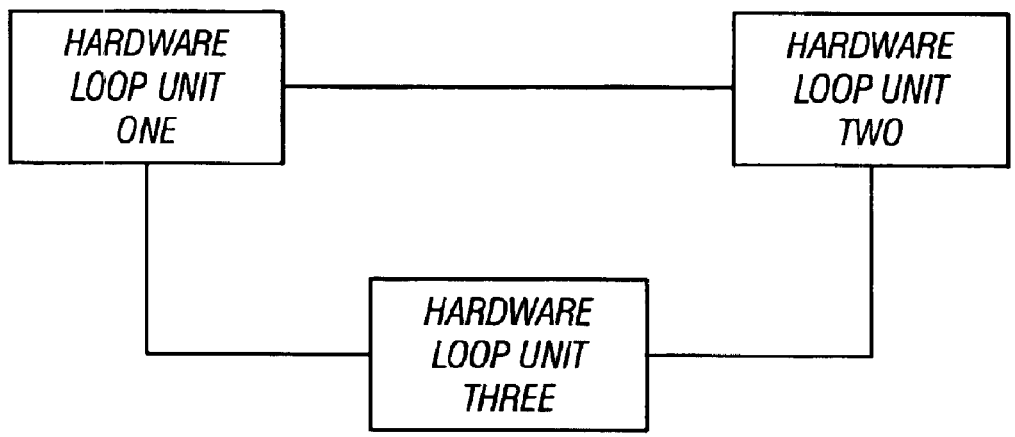
Figure 23C:
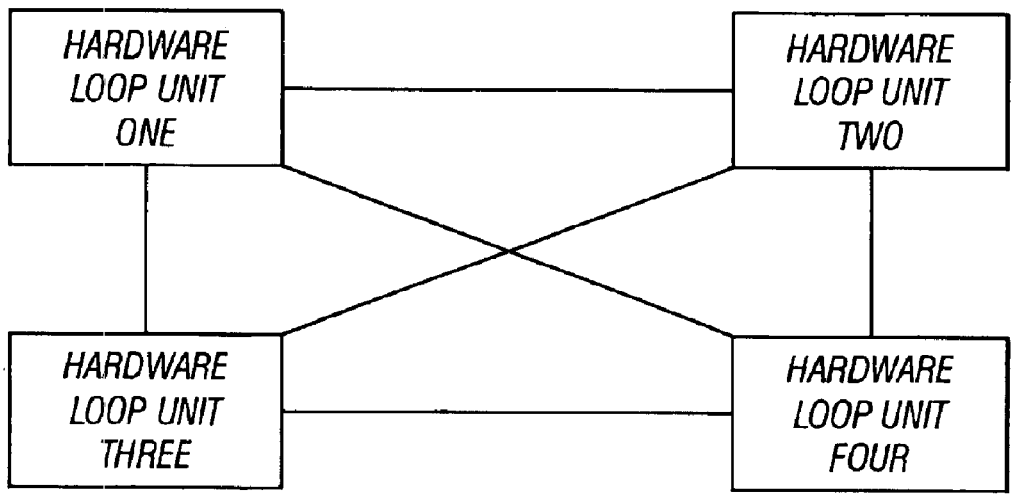

In other embodiments (as shown in FIGS. 23A–23C), a number of hardware loop units may be implemented. The output of any of the number of hardware loop units may be connected to the respective input of one or more other hardware loop units. In this manner, a second hardware loop unit may be loaded via the output of a first hardware loop unit. Again, this may provide power savings insofar as a memory device is not fired up to load the second hardware loop unit.

In some cases, a plurality of loop units may be used to service nested loops (or coincident loops). An inner hardware loop unit may hold one or more instructions that are aligned in an outer hardware loop unit. Moreover, the inner hardware loop unit may be loaded by sending the aligned instructions from the outer hardware loop unit to the input of the inner hardware loop unit.

In still other embodiments, an independent plurality of hardware loop units may be implemented. However, if two or more independent hardware loop units are used in the same DSP system, a restriction may be used. For instance, when both loops have the same bottom instruction, one of the loops may be defined as the outer loop. Without this restriction the circuit might encounter two bottom matches and not know which one to decrement.

Yet another mode of operation involves power management of hardware loops. When hardware loops are enabled, an ETop register may be compared to the PC to account for each top match. Likewise, an EBot register may be compared to the PC to account for each bottom match. However, when hardware loops are disabled, any switching in the comparator circuits may be merely a waste of power. Therefore, it may be advantageous to disable bottom match and top match comparator circuits when a hardware loop is disabled. By choosing inputs to a comparator to disable the comparator when the hardware loop is disabled, power may be conserved.

Figure 24:
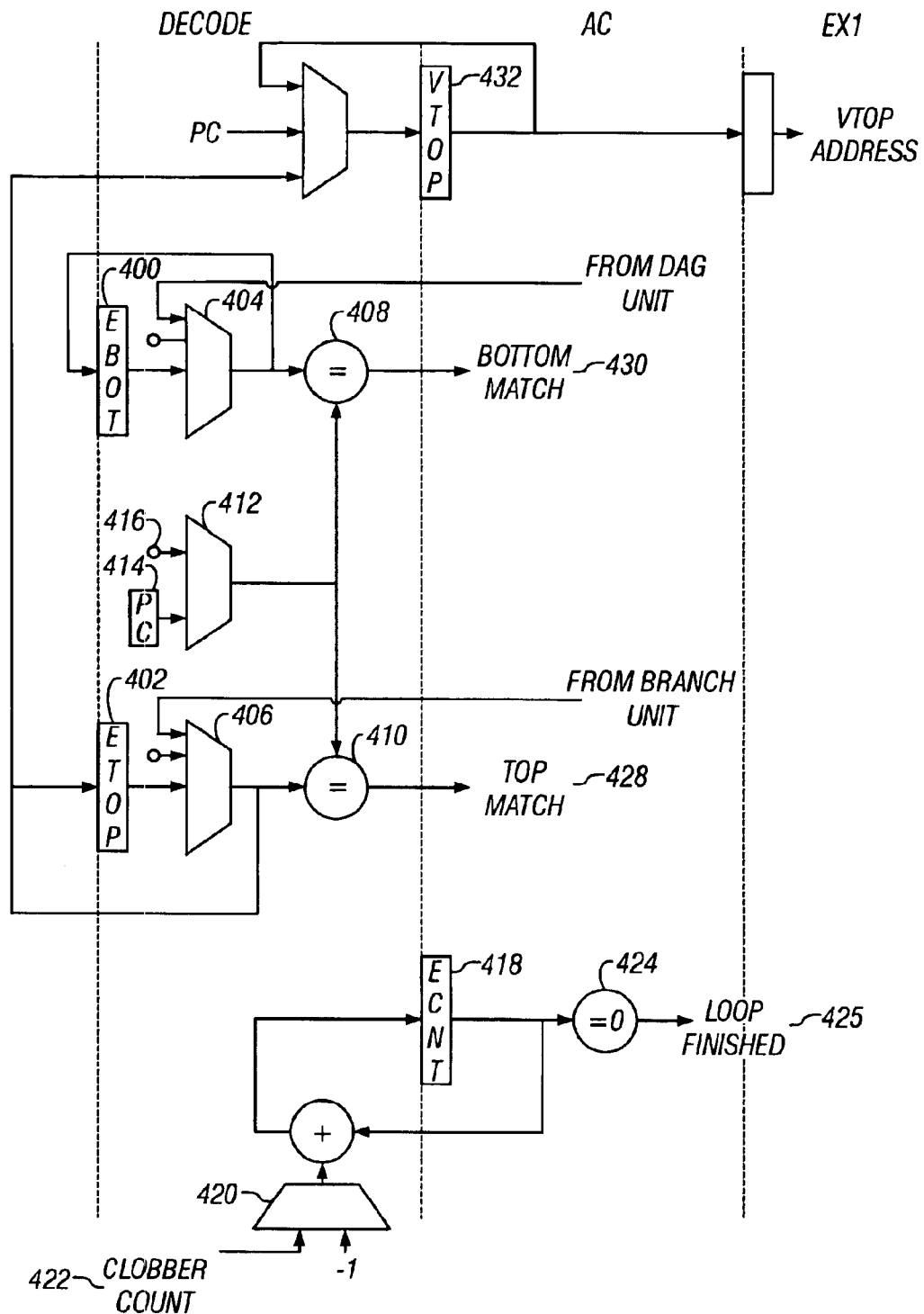
FIG. 24 is block diagram showing power saving circuitry in accordance with an embodiment of the present invention.

FIG. 24 is an exemplary embodiment showing power saving circuitry. ETop register 400 and EBot register 402 respectively provide one of a number of inputs to multiplexers 404 and 406. The output of multiplexers 404 and 406 may be inputs to comparators 408 and 410. The other input to comparators 408 and 410 may come from the output of multiplexer 412. The inputs of multiplexer 412 may come from the program counter 414 and a loop disable signal 416 from a control unit. Multiplexers 404, 406 and 412 may be arranged such that when hardware loops are disabled, the output of multiplexer 412 is different from the output of multiplexers 404 and 406. This may ensure that no switching occurs in comparators 408 or 410 when the hardware loops are disabled.

In one embodiment, the same loop disable signal 416 may be sent to multiplexers 404, 406 and 412. However, an inverter (not shown) may invert a bit before multiplexer 412 receives the signal. In this manner, the output of multiplexer 412 may be different than that of multiplexers 404 and 406 when a loop disable signal is sent to the circuit.

FIG. 24 also illustrates an exemplary circuit for incrementing an ECnt register 418. On each pass of the loop, multiplexer 420 may decrement the ECnt register. However, if adjustment is necessary, the adjustments signal (e.g. the clobber count 422) may adjust the ECnt accordingly. Once the loop has finished its last iteration, comparator 424 may send a signal 425 so indicating.

FIG. 24 also illustrates how bottom matches and top matches may be detected. When comparator 410 detects that the program counter 412 and ETop register have the same value, a Top Match signal 428 may be sent. When comparator 408 detects that the program counter and the EBot register have the same value, a Bottom Match signal 430 may be sent.

Finally, FIG. 24 also illustrates a VTop register 432 implemented in a pipeline. As described, herein, VTop may be an address register holding the address of a next instruction following a plurality of instructions loaded into loop hardware (not shown).

Various embodiments of the invention have been described. For example, numerous hardware loop techniques have been described for implementation within a processor. The processor may be implemented in a variety of systems including general purpose computing systems, digital processing systems, laptop computers, personal digital assistants (PDA's) and cellular phones. In this context, the hardware loops discussed above may be readily used to increase processing speed without significantly increasing power consumption. In such a system, the processor may be coupled to a memory device, such as a FLASH memory device or a static random access memory (SRAM) that stores an operating system and other software applications. These and other embodiments are within the scope of the following claims.

What is claimed is:

1. A method comprising:
    loading a first subset of a sequence of instructions into loop hardware as part of a first pass through a loop, wherein the loop is a sequence of instructions that comprises the first subset and a second subset, the first subset includes a first instruction in the loop, and the second subset includes a last instruction in the loop;
    issuing the first subset from loop hardware as part of a subsequent pass through the loop; and
    as part of the subsequent pass through the loop
        retrieving the second subset of the sequence of instructions from a memory device substantially simultaneously as the first subset is being issued from loop hardware, wherein the loop hardware is bypassed to retrieve the second subset.

2. The method of claim 1, the method further comprising issuing the second subset after the first subset has been issued.

3. The method of claim 1, the method further comprising:
    issuing the first subset from the loop hardware as part of every subsequent pass through the loop; and
    retrieving the second subset of the sequence of instructions from the memory device substantially simultaneously as the first subset is being issued as part of every subsequent pass through the loop.

4. The method of claim 1, wherein retrieving a second subset of the sequence of instruction from a memory device comprises retrieving a second subset of the sequence of instructions from a cache.

5. The method of claim 1, wherein retrieving a second subset of the sequence of instruction from a memory device comprises retrieving a second subset of the sequence of instructions from SRAM.

6. The method of claim 1, wherein loading a first subset of a sequence of instructions into loop hardware as part of a first pass through a loop, and
    issuing the first subset from loop hardware as part of a subsequent pass through the loop comprise:
        loading a first subset of a sequence of instructions into a set of loop buffers as part of a first pass through a loop, and
        issuing the first subset from the set of loop buffers as part of a subsequent pass through the loop.

7. The method of claim 1, wherein retrieving the second subset of the sequence of instructions from the memory device substantially simultaneously as the first subset is being issued as part of a subsequent pass through the loop comprises:

retrieving the next instruction in the sequence of instructions immediately following the first subset from the memory device substantially simultaneously as the first subset is being issued as part of a subsequent pass through the loop.

8. The method of claim 1, wherein the method comprises finishing retrieval of the second subset before instructions in the first subset have been issued.

9. The method of claim 1, wherein retrieving a second subset comprises retrieving a number of instructions, a first instruction in the number being a next instruction in the sequence of instructions immediately following the first subset.

10. An apparatus comprising:
a control unit comprising:
an instruction fetch unit; and
loop hardware coupled to the instruction fetch unit; and
a decoder coupled to the instruction fetch unit and the loop hardware,
wherein the control unit is adapted to:
load a first subset of instructions into the loop hardware as part of a first pass through a loop, wherein the loop is a sequence of instructions that comprises the first subset and a second subset, the first subset includes a first instruction in the loop, and the second subset includes a last instruction in the loop;
issue the first subset from the loop hardware as part of a subsequent pass through the loop; and
as part of a subsequent pass through the loop,
retrieve the second subset of the sequence of instructions from the memory device substantially simultaneously as the first subset is being issued from loop hardware, wherein the loop hardware is bypassed to retrieve the second subset.

11. The apparatus as in claim 10, wherein the loop hardware comprises at least one set of buffers coupled in parallel.

12. The apparatus as in claim 11, wherein the set of buffers are loop buffers.

13. The apparatus as in claim 12, the apparatus further comprising a memory device, wherein the instruction fetch unit is coupled to the memory device.

14. The apparatus as in claim 13, wherein the memory device is a cache.

15. The apparatus as in claim 10, wherein the control unit is further adapted to issue the second subset after the first subset has been issued.

16. The apparatus as in claim 10, wherein the control unit is further adapted to:
issue the first subset from the loop hardware as part of every subsequent pass through the loop; and
retrieve the second subset of the sequence of instructions from the memory device substantially simultaneously as the first subset is being issued as part of every subsequent pass through the loop.

17. A system comprising:
an SRAM memory device;
loop hardware; and
a processor coupled to the memory device, wherein the processor includes a control unit adapted to:
load a first subset of a sequence of instructions into the loop hardware as part of a first pass through a loop, wherein the loop is a sequence of instructions that comprises the first subset and a second subset, the first subset includes a first instruction in the loop, and the second subset includes a last instruction in the loop;
issue the first subset from the loop hardware as part of a subsequent pass through the loop; and
as part of a subsequent pass through the loop,
retrieve the second subset of the sequence of instructions from a memory device substantially simultaneously as the first subset is being issued from loop hardware, wherein the loop hardware is bypassed to retrieve the second subset.

18. The system as in claim 17, wherein the control unit is further adapted to issue the second subset after the first subset has been issued.

19. The system as in claim 17, wherein the control unit is further adapted to:
issue the first subset from the loop hardware as part of every subsequent pass through the loop; and
retrieve the second subset of the sequence of instructions from the memory device substantially simultaneously as the first subset is being issued as part of every subsequent pass through the loop.

20. The system as in claim 17, wherein the loop hardware includes at least one set of buffers.

21. The system as in claim 20, wherein the set of buffers are loop buffers.

22. A method comprising:
loading a first subset of a sequence of instructions into a set of buffers as part of a first pass through a loop;
issuing the first subset from the set of buffers as part of a subsequent pass through the loop, wherein the loop is a sequence of instructions that comprises the first subset and a second subset, the first subset includes a first instruction in the loop, and the second subset includes a last instruction in the loop;
as part of a subsequent pass through the loop, retrieving the second subset of the sequence of instructions from a memory device substantially simultaneously as the first subset is being issued from loop hardware, wherein the loop hardware is bypassed to retrieve the second subset; and
issuing the second subset after the first subset has been issued as part of a subsequent pass through the loop.

23. The method of claim 22, wherein retrieving a second subset of the sequence of instruction from a memory device comprises retrieving a second subset of the sequence of instructions from a cache.

24. The method of claim 22, wherein retrieving the second subset of the sequence of instructions from the memory device substantially simultaneously as the first subset is being issued as part of a subsequent pass through the loop comprises:
retrieving the next instruction in the sequence of instructions immediately following the first subset from the memory device substantially simultaneously as the first subset is being issued as part of a subsequent pass through the loop.

25. The method of claim 22, wherein the method comprises finishing retrieval of the second subset before instructions in the first subset have been issued.

26. The method of claim 22, wherein retrieving a second subset comprises retrieving a number of instructions, a first instruction in the number being a next instruction in the sequence of instructions immediately following the first subset.

27. A method comprising:
loading a first n instructions of a sequence of instructions representing a loop into loop hardware during a first pass through a loop, wherein the loop is represented by a sequence of instructions that comprises the first n instructions and at least one more instruction, n is a positive integer, and the loop hardware is operative to buffer at least part of the sequence of instructions; and
issuing at least one of the first n instructions from the loop hardware.

28. The method of claim 27, the method further comprising loading an address of an $(n+1)^{th}$ instruction into an instruction address register during the first pass through the loop.

29. The method of claim 28, the method further comprising issuing the first n instructions from the loop hardware during a subsequent pass through the loop.

30. The method of claim 29, the method further comprising issuing instructions from the loop hardware during every subsequent pass through the loop.

31. The method of claim 29, the method further comprising retrieving an $(n+1)^{th}$ instruction substantially simultaneously as issuing the first n instructions during a subsequent pass through the loop.

32. The method of claim 28, the method further comprising aligning a next (m) instructions in a memory device, wherein m is a positive integer.

33. The method of claim 32, the method further comprising:
retrieving an $(n+1)^{th}$ instruction substantially simultaneously as issuing the first n instructions;
issuing the $(n+1)^{th}$ instruction; and
retrieving an $(n+2)^{th}$ instruction substantially simultaneously as issuing the $(n+1)^{th}$ instruction.

34. The method of claim 33, the method further comprising:
issuing the $(n+2)^{th}$ instruction; and
retrieving an $(n+3)^{th}$ instruction substantially simultaneously as issuing the $(n+2)^{th}$ instruction.

35. The method of claim 27, the method further comprising not accessing a memory device while issuing at least one instruction from the loop hardware.

36. An apparatus comprising:
a control unit adapted to load a first n instructions of a sequence of instructions representing a loop into loop hardware during a first pass through a loop, wherein the loop is represented by a sequence of instructions that comprises the first n instructions and at least one more instruction, n is a positive integer, and the control unit is operative to load at least part of the sequence of instructions, the control unit comprising:
an instruction fetch unit; and
loop hardware connected to the fetch unit; and
a decoder connected to the control unit.

37. The apparatus as in claim 36, the apparatus further comprising a memory device connected to the instruction fetch unit.

38. The apparatus as in claim 37, wherein the memory device is a cache.

39. The apparatus as in claim 36, the apparatus further comprising an instruction address register, wherein the control unit is adapted to load an address of an $(n+1)^{th}$ instruction into the instruction address register during the first pass through the loop.

40. The apparatus as in claim 39, wherein the control unit is adapted to issue the first n instructions from the loop hardware during a subsequent pass through the loop.

41. The apparatus as in claim 40, wherein the control unit is adapted to issue instructions from the loop hardware during every subsequent pass through the loop.

42. The apparatus as in claim 40, wherein the control unit is adapted to retrieve an $(n+1)^{th}$ instruction substantially simultaneously as issuing the first n instructions during a subsequent pass through the loop.

43. The apparatus as in claim 37, further comprising an instruction address register, wherein the control unit is adapted to load an address of an $(n+1)^{th}$ instruction into the instruction address register during the first pass through the loop and align a next (m) instructions in the memory device, wherein m is a positive integer.

44. The apparatus as in claim 43, wherein the control unit is adapted to:
retrieve an $(n+1)^{th}$ instruction substantially simultaneously as issuing the first n instructions;
issue the $(n+1)^{th}$ instruction; and
retrieve an $(n+2)^{th}$ instruction substantially simultaneously as issuing the $(n+1)^{th}$ instruction.

45. The apparatus as in claim 44, wherein the control unit is adapted to:
issue the $(n+2)^{th}$ instruction; and
retrieve an $(n+3)^{th}$ instruction substantially simultaneously as issuing the $(n+2)^{th}$ instruction.

46. The apparatus as in claim 37, the apparatus adapted to not access the memory device while instructions are being issued from the loop hardware.

47. The apparatus as in claim 36, wherein the loop hardware includes at least one set of buffers coupled in parallel.

48. The apparatus as in claim 47, wherein the set of buffers are loop buffers.

49. A system comprising:
an SRAM memory device;
loop hardware; and
a processor coupled to the memory device, wherein the processor includes a control unit adapted to:
load a first n instructions of a sequence of instructions representing a loop into the loop hardware during a first pass through a loop, wherein the loop is represented by a sequence of instructions that comprises the first n instructions and at least one more instruction, n is a positive integer, and the control unit is operative to load at least part of the sequence of instructions.

50. The system as in claim 49, wherein the loop hardware includes at least one set of buffers coupled in parallel.

51. The system of claim 49, the system further comprising an instruction address register, wherein the control unit is adapted to load an address of an $(n+1)^{th}$ instruction into the instruction address register during the first pass through the loop.

52. The system of claim 51, wherein the control unit is adapted to issue the first n instructions from the loop hardware during a subsequent pass through the loop.

53. The system of claim 52, wherein the control unit is adapted to issue the first n instructions from the loop hardware during every subsequent pass through the loop.

54. The system of claim 52, wherein the control unit is adapted to retrieve an $(n+1)^{th}$ instruction substantially simultaneously as issuing the first n instructions during a subsequent pass through the loop.

55. The system of claim 51, wherein the control unit is adapted to align a next (m) instructions in the memory device, wherein m is a positive integer.

56. The system of claim 55, wherein the control unit is adapted to:

retrieve an (n+1)$^{th}$ instruction substantially simultaneously as issuing the first n instructions;

issue the (n+1)$^{th}$ instruction; and retrieve an (n+2)$^{th}$ instruction substantially simultaneously as issuing the (n+1)$^{th}$ instruction.

57. The system of claim 56, wherein the control unit is adapted to:

issue the (n+2)$^{th}$ instruction; and retrieve an (n+3)$^{th}$ instruction substantially simultaneously as issuing the (n+2)$^{th}$ instruction.

58. The system of claim 51, wherein the system is adapted to access the memory device while issuing instructions from the loop hardware.

59. A method comprising:

loading a first n instructions of a sequence of instructions representing a loop into loop hardware during a first pass through a loop, wherein the loop is represented by a sequence of instructions that comprises the first n instructions and at least one more instruction, n is a positive integer, and the loop hardware is operative to buffer at least part of the sequence of instructions;

loading an address of an (n+1)$^{th}$ instruction into an instruction address register during the first pass through the loop;

aligning a next (m) instructions in a memory device, wherein m is a positive integer;

issuing the first n instructions from the loop hardware during a subsequent pass through the loop;

retrieving an (n+1)$^{th}$ instruction using the address loaded in the instruction address register substantially simultaneously as issuing the first n instructions during a subsequent pass through the loop;

issuing the (n+1)$^{th}$ instruction; and retrieving an (n+2)$^{th}$ instruction substantially simultaneously as issuing the (n+1)$^{th}$ instruction.

60. The method of claim 59, the method further comprising issuing the (n+2)$^{th}$ instruction; and retrieving an (n+3)$^{th}$ instruction substantially simultaneously as issuing the (n+2)$^{th}$ instruction.

61. A method comprising:

loading a set of instructions in an order of execution into loop hardware; and storing an address of a next instruction in an address register, wherein the next instruction is the next instruction in a sequence of instructions that represent a loop and the address register is operative in fetching part of the sequence of instructions.

62. The method as in claim 61, wherein the set of instructions is a first set of instructions, the method further comprising:

loading a second set of instructions in order of execution in a memory device, wherein the second set of instructions is part of the sequence of instructions that represent the loop.

63. The method as in claim 61, wherein loading a second set of instructions in order of execution in a memory device comprises loading a second set of instruction in order of execution in a cache, wherein the second set of instructions is part of the sequence of instructions that represent the loop.

64. The method as in claim 61, wherein loading a set of instructions in an order of execution into loop hardware comprises loading a set of instructions in order of execution into a set of buffers.

65. The method as in claim 64, wherein the set of buffers comprises n buffers coupled in parallel, n being a positive integer, and wherein loading a set of instructions in an order of execution into loop hardware comprises loading n sequential instructions into the n buffers.

66. The method of claim 61, wherein loading n sequential instructions into the n buffers comprises loading a first n instructions of a loop into the n buffers.

67. The method of claim 66, wherein loading n sequential instructions into the n buffers comprises loading a last n instructions of a loop into the n buffers.

68. The method of claim 61, further comprising issuing the set of instructions from the loop hardware.

69. An apparatus comprising:

a control unit adapted to load a set of instructions in order of execution into loop hardware and store an address of a next instruction in an address register, wherein the next instruction is the next instruction in a sequence of instructions that represent a loop and the address register is operative in fetching part of the sequence of instructions, the control unit comprising:

an instruction fetch unit, an address register connected to the fetch unit, and loop hardware connected to the fetch unit; and a decoder connected to the instruction fetch unit and the loop hardware.

70. The apparatus as in claim 69, further comprising a memory device connected to the control unit, wherein the set of instructions is a first set of instructions, and the control unit is adapted to load a second set of instructions in order of execution into the memory device, wherein the second set of instructions is part of the sequence of instructions that represent the loop.

71. The apparatus as in claim 70, wherein the loop hardware includes a set of buffers.

72. The apparatus as in claim 71, wherein the set of buffers comprises n buffers coupled in parallel, n being a positive integer, and wherein loading a set of instructions in an order of execution into loop hardware comprises loading n sequential instructions into the n buffers.

73. A system comprising:

an SRAM memory device;

loop hardware, an address register; and a processor coupled to the memory device, wherein the processor includes a control unit adapted to:

load a set of instructions in order of execution in the loop hardware; and store an address of a next instruction in the address register, wherein the next instruction is the next instruction in a sequence of instructions that represent a loop and the address register is operative in fetching part of the sequence of instructions.

74. The system as in claim 73, wherein the loop hardware includes at least one set of loop buffers.

75. The system as in claim 74, wherein the set of buffers comprises n buffers coupled in parallel, n being a positive integer, and wherein the control unit is adapted to load n sequential instructions into the n buffers.

* * * * *

UNITED STATES PATENT AND TRADEMARK OFFICE
CERTIFICATE OF CORRECTION

PATENT NO. : 6,898,693 B1  Page 1 of 1
APPLICATION NO. : 09/705088
DATED : May 24, 2005
INVENTOR(S) : Ravi P. Singh et al.

It is certified that error appears in the above-identified patent and that said Letters Patent is hereby corrected as shown below:

Please amend Item "(56) References Cited" by adding the following references cited:

| | | | |
|---|---|---|---|
| 5,710,913 | 1/1998 | Gupta et al. | 712/241 |
| 5,727,194 | 3/1998 | Shridhar et al. | 712/241 |
| 6,178,499 | 1/2001 | Stotzer et al. | 712/241 |
| 6,269,440 | 7/2001 | Fernando et al. | 712/241 |
| 6,505,295 | 1/2003 | Hiraki et al. | 712/241 |
| 6,598,155 | 7/2003 | Ganapathy et al. | 712/241 |

Signed and Sealed this

Eighteenth Day of July, 2006

JON W. DUDAS
*Director of the United States Patent and Trademark Office*